United States Patent [19]
Brandli et al.

[11] Patent Number: 5,701,469
[45] Date of Patent: Dec. 23, 1997

[54] METHOD AND SYSTEM FOR GENERATING ACCURATE SEARCH RESULTS USING A CONTENT-INDEX

[75] Inventors: Stephen A. Brandli, Bothell; William P. Jones, Kirkland, both of Wash.

[73] Assignee: Microsoft Corporation, Redmond, Wash.

[21] Appl. No.: 477,486

[22] Filed: Jun. 7, 1995

[51] Int. Cl.⁶ .................................................. G06F 17/30
[52] U.S. Cl. .......................................................... 395/613
[58] Field of Search ................................ 395/613, 603, 395/605

[56] References Cited

U.S. PATENT DOCUMENTS

| | | | |
|---|---|---|---|
| 4,939,689 | 7/1990 | Davis et al. | 395/613 |
| 5,204,958 | 4/1993 | Cheng et al. | 395/600 |
| 5,347,653 | 9/1994 | Flynn et al. | 395/600 |
| 5,404,518 | 4/1995 | Gilbertson et al. | 395/613 |
| 5,475,837 | 12/1995 | Ishak et al. | 395/600 |
| 5,530,851 | 6/1996 | Fortier | 395/600 |

*Primary Examiner*—Wayne Amsbury
*Attorney, Agent, or Firm*—Seed and Berry LLP

[57] ABSTRACT

A method and system for generating accurate search results using a content-index is provided. In a preferred embodiment, a content-index search system is invoked in response to a query on a collection of objects. The collection of objects is indexed by the content-index and may, for example, be a corpus of documents indexed by the terms contained in the documents. The content-index search system uses the content-index to generate and store an initial search result in response to the query. Because the content-index is typically out of date with respect to a dynamically changing collection of objects, the content-index search system invokes search result correction routines to remove from the stored search result references that were incorrectly included and to add to the stored search result references that were incorrectly excluded. References that were incorrectly included include those that refer to objects that no longer exist and those that refer to objects that have been modified since the content-index was last updated and that no longer match the search criteria. References that were incorrectly excluded include those that refer to new objects that were not indexed and match the search criteria and those that refer to objects that have been modified since the content-index was last updated and that now match the search criteria.

60 Claims, 13 Drawing Sheets

METHOD AND SYSTEM FOR GENERATING ACCURATE SEARCH RESULTS USING A CONTENT-INDEX

TECHNICAL FIELD

This invention relates generally to a computer method and system for generating accurate search results, and, more specifically, to a computer method and system for generating accurate search results using a content-index that is not kept up to date in real time.

BACKGROUND OF THE INVENTION

Existing computer systems provide the capability to search a collection of documents to identify those documents that contain a certain word, or phrase, or a combination of words. For example, given a collection of documents, the computer system can return a list of the documents that contain the word "patent" or can return a list of the documents that contain the phrase "patent application." In addition, the computer system can return a list of the documents that either contain the word "patent" or contain the word "application." This list includes those documents that only contain the word "patent," those that only contain the word "application," and those that contain both words.

Such computer systems also provide the ability to efficiently find or retrieve documents in response to such queries by indexing the contents of the documents. Indexing information is typically stored in a structure referred to as a content-index. A content-index typically indexes multiple documents and includes indexing data (e.g., keywords) and reference data that refers to the documents that contain the indexing data. For example, a typical content-index may store as the indexing data each major term contained in each document. Each term is stored as a separate entry in the content-index and each entry contains a reference to the documents that contain that term. Thus, a content-index can be used to determine which documents contain a particular term.

A content-index is typically stored in an efficient data structure, such as a hash table or B-tree, so that information can be retrieved efficiently in response to queries. A typical content-index can be used to answer simple queries involving the use of an indexed term verbatim, as a prefix, or as queries involving the use of an indexed term verbatim, as a prefix, or as specifying a range. For example, if the indexed term is the word "second," then the content-index can be used to find all documents that contain the word "second." Also, the content-index can be used to find all documents containing the word "second" as a prefix. For example, a document containing the word "secondary" would satisfy (match) the query. Also, for example, if the indexed term is a range, for example, "second-fourth," then a document containing the word "third" would satisfy the query. Such queries involve a simple lookup of the term in the content-index and the retrieval of the set of documents that contain the indexed term or a term within the specified range.

Typically, generating or updating a content-index for a collection (oftentimes referred to as a corpus) of documents is a slow process. Each document is read and parsed into the terms that will be used as indexing data and then the appropriate entries are generated in the data structures of the content-index. For large documents or a large number of documents this process is very time-consuming. Also, it is difficult to keep a content-index up to date when the corpus of documents is continuously changing. In such scenarios, the content-index is typically not kept up to date. Instead, existing systems typically either (1) update the content-index in response to an explicit command by the user, (2) update the content-index at some predetermined interval, e.g. every night, or (3) update the content-index each time a query program receives a query. More specifically, in the third case, when the query program receives a query regarding the content of the corpus of documents, the query program first updates the content-index and then executes the query. For many scenarios, the update procedure of the third case is too slow to be useful.

SUMMARY OF THE INVENTION

The limitations of prior methods and systems are overcome by the present invention, which is an improved method and system for generating accurate search results using a content-index. In a preferred environment, a content-index that indexes a collection of objects is generated and stored in a computer system. In response to a query, an initial search result is generated using the content-index and stored. The stored search result contains references to objects in the collection that match a search criteria specified in the query. Once the search result is initially generated using the content-index, the method and system improves the accuracy of the stored search result by removing references to objects that should not have been included, i.e., false positive results, and by adding references to objects that should have been included, i.e., false negative results. False positive results include references to objects that no longer exist in the collection of objects and references to objects that no longer match the search criteria. False negative results include references to objects that are new to the collection of objects and match the search criteria. False negative results also include references to objects that have been modified since they were last indexed in the content-index and now match the search criteria.

In another embodiment, the objects in the collection are documents.

In yet another embodiment, the collection of objects is only partially indexed by the content-index and the initial search result is generated using both the content-index and the remaining objects in the collection.

In yet another embodiment, the collection of objects is indexed by multiple content-indices. These multiple content-indices are used in the removal of false positive results and in the addition of false negative results.

In yet another embodiment, a timestamp is stored as part of the content-index to facilitate the determination of modified objects.

In yet another embodiment, a system is provided with components that include: object list sorters; an object list comparator that generates a list of new or modified objects; an object reference subtractor that compares the output of the object list comparator and the sorted search result to generate a list of new or modified objects that have not yet been added to the search result; an object direct search engine that directly searches each object referred to by the output of the object reference subtractor to generate a list of new or modified objects that match the search criteria; and a search result adder that receives output from the object direct search engine and adds to the search result references to objects that match the search criteria. In another embodiment, some of these system components work together in a pipelined architecture fashion, processing a single reference to an object at a time.

In yet another embodiment, a similar system of components is used to add false negative results to the stored search result.

DETAILED DESCRIPTION OF THE INVENTION

Figure 1:
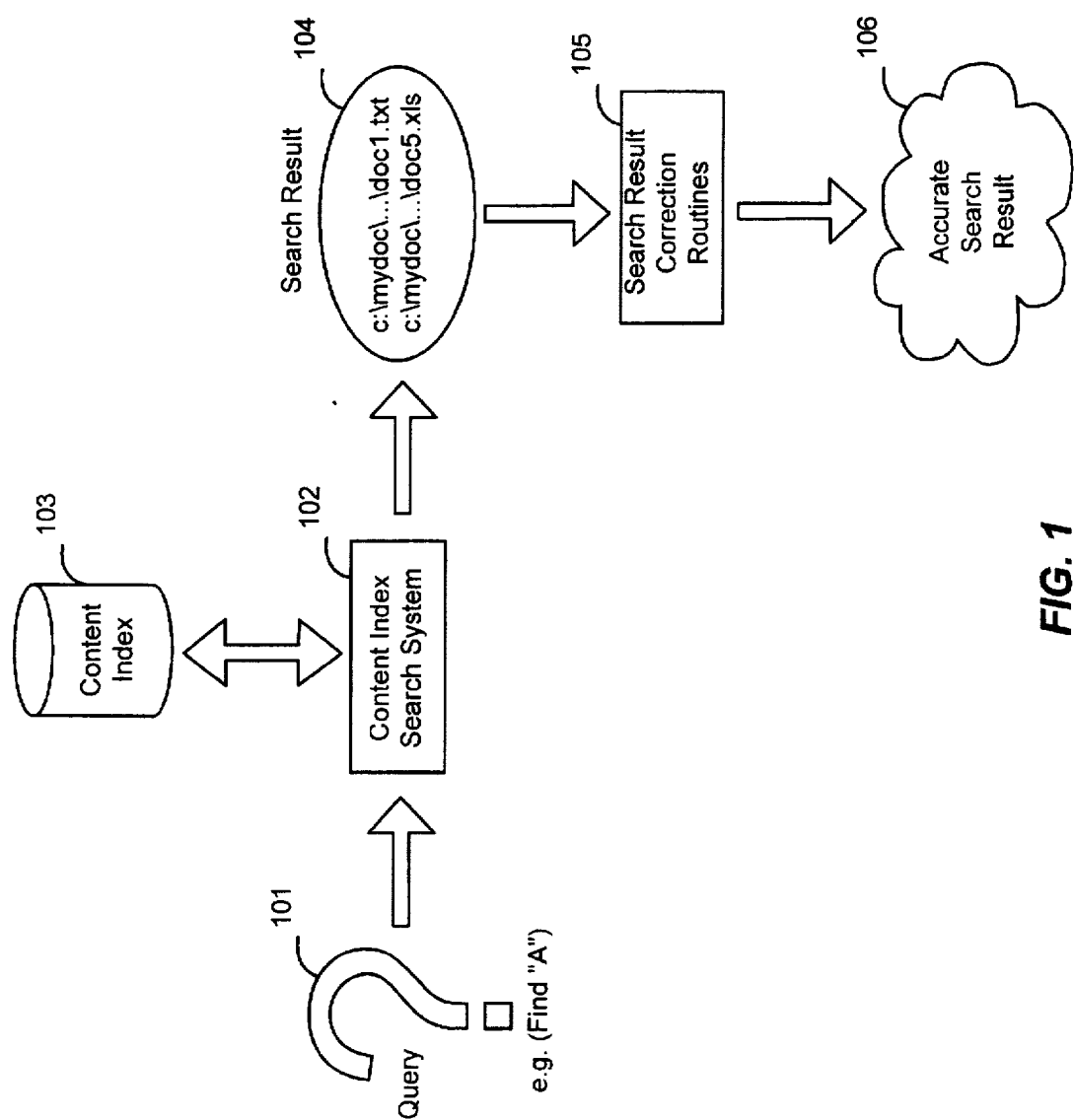
FIG. 1 is an overview block diagram of the process used to generate an accurate search result.

The present invention provides methods and systems for generating accurate search results using a content-index. According to the present invention, a user or a query program generates a query regarding objects that are indexed by the content-index. In response, a content-index search system responsible for executing the query uses the content-index to initially generate a search result. This generation of an initial search result is accomplished using well-known mechanisms, such as searching the content-index for the indexing terms specified by the search criteria and retrieving references to objects that contain those terms, as indicated by the content-index. As described in the background section, where the collection of objects indexed by the content-index is dynamically changing, it is virtually impossible to keep the content-index up to date. Thus, the initial search result generated and stored in response to the query has a high likelihood of being incorrect.

Once the initial search result is generated, the methods and systems of the present invention correct the stored search result by removing from the search result references to objects that should not have been included and by adding to the search result references to objects that should have been included. References that should not have been included are referred to as false positive results. References that should have been included but were not included are referred to as false negative results. In order to remove false positive results, a search result correction routine removes references to objects that no longer exist in the collection and removes references to objects that have been modified since they were last indexed by the content-index and no longer match the search criteria. Similarly, to add false negative results, a search result correction routine adds references to objects that have been added to the collection and match the search criteria but have not yet been indexed in the content-index and adds references to objects that have been modified since the content-index was last updated and now match the search criteria. In this manner, the search result generated in response to a user query is made accurate even though the content-index used to generate the initial search result is not up to date.

In one embodiment, references to objects that no longer exist are determined by examining the list of objects referred to in the search result to determine whether each object still exists in the collection of objects. Also, references to objects that no longer match the search criteria are determined by examining each reference in the search result and determining whether the object referred to has been modified since the time the object was last indexed in the content-index. For each such modified object, the object is examined to determine whether it still matches the search criteria. For the purposes of this invention, matching a search criteria and satisfying a search criteria are synonomous expressions.

Similarly, references to new objects that match the search criteria are determined by comparing the objects currently in the collection with those objects indexed by the content-index to determine the objects that have been added to the collection since the content-index was last updated. Each of these new objects is then examined to determine whether the object matches the search criteria. Also, references to objects that have been modified since they were last indexed by the content-index and now match the search criteria are determined by comparing the time the object was last updated according to the content-index with the time the object was last modified according to the attributes of the object in the collection. Each of the objects that has been modified since the time indicated in the content-index is then searched to determine whether it now matches the search criteria.

FIG. 1 is an overview block diagram of the process used to generate an accurate search result. A query 101 is generated by a program or by a user and sent as input to content-index search system 102. For the purposes of this invention, the content-index search system 102 is preferably code that searches a content-index 103 based on a query and generates a search result 104. The search result, however, is only accurate as of the last time the content-index 103 was updated. Thus, as is typical when indexing a dynamic collection of objects, the search result 104 may be inaccurate. The methods and systems of the present invention are invoked as search result correction routines 105 to correct the search result 104 to generate an accurate search result 106.

One skilled in the art will recognize that the content-index search system 102 may be an existing system and that the search result correction routines 105 correct the results generated by the existing system. Alternatively, the content-index search system 102 and the search result correction routines 105 may be part of the same improved content-index search system. Other variations are also possible.

The present invention also provides the ability to correct a search result when the collection of objects is only partially indexed by the content-index. In such cases, a content-index inclusion rule is provided for determining whether a given object is indexed by the content-index. The portion of the collection of objects indexed by the content-index is referred to as the domain of the content-index. To accommodate partial indexing, the methods and systems used to generate an initial search result are modified to search the remaining portion of the collection of objects not part of the domain in addition to using the content-index. The search correction addition and removal routines are then optimized to ignore entries in the search result that were generated from the remaining portion of the collection of objects. These entries are ignored because they are known to be accurate.

The present invention also provides the ability to use multiple content-indices. That is, a collection of objects may be indexed by more than one content-index. In this case, the methods and systems of the present invention examine the multiple content-indices as needed to efficiently determine what references to objects to add to or remove from the search results. For example, in order to determine whether an object has been modified since it was last indexed by a content-index, all of the content-indices are typically examined to search for the last time the object was indexed by one of the content-indices. Alternatively, if the indices are mutually exclusive (that is, it is known that only one index indexes a particular object of a collection at a time), then the content-indices are searched only until one index is found that contains the object in question. (Because this index contains a reference to the object, then by definition of being mutually exclusive, the time indicated in that content-index represents the time the object was last indexed.) Moreover, optimizations made to the methods and systems to accommodate the use of multiple content-indices can be combined with the optimizations made to accommodate a partially indexed collection of objects.

Figure 2:
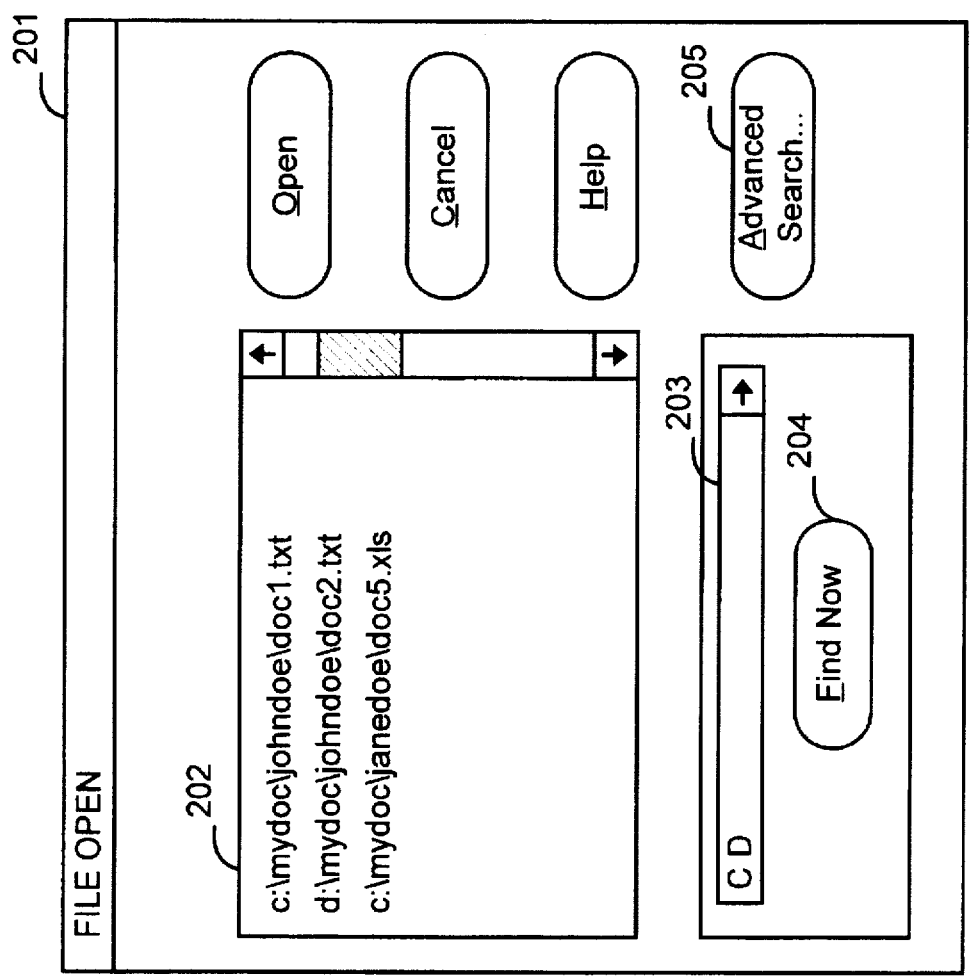
FIG. 2 is an example diagram of a File Open dialog that incorporates the methods and systems of the present invention.

For example, the methods and systems of the present invention can be embodied in a File Open dialog, such as that provided by a word processing application, to open for editing a particular document (or set of documents) that match a specified search criteria. FIG. 2 is an example diagram of a File Open dialog that incorporates the methods and systems of the present invention. The File Open dialog window 201 contains search result list box 202, search string edit field 203, and various buttons, e.g., the "Find Now" button 204 and the "Advanced Search" button 205. When a user wants to open a file that matches a certain search criteria, but does not remember the correct file name, the user can enter a text string in the search string edit field 203 and press the "Find Now" button 204 to instruct the word processing application to find all of the documents containing the search string specified in edit field 203.

The "Advanced Search" button 205, when depressed, generates an additional dialog, which allows the user to specify a more complex search criteria. Specifically, if the user wishes to specify a combination of text strings to search for, then the user uses the Advanced Search dialog to enter the text strings and the way in which the text strings should be combined. For example, the user could specify a search to find all documents containing the word "patent" or the word "application" or both words (sometimes denoted as "patent OR application").

As shown in FIG. 2, the search result list box 202 currently contains the names of the files that contain the text string specified as the search criteria in edit field 203 after the user has pressed the "Find Now" button 204. Specifically, the search result list box 202 contains the names of three files, "c:\mydoc\johndoe\doc1.txt," "c:\mydoc\johndoe\doc2.txt," and "c:\mydoc\janedoe\doc5.xls," which contain the string "C D" shown in edit field 203. The search result that is displayed in the search result list box 202 is generated using the methods and systems of the present invention. Specifically, an initial result of the search is generated using a content-index that indexes the files of the file system. This initial search result is then corrected using the methods described in detail below to generate an accurate list of the files that match the search criteria specified in the search string edit field 203.

Although the present invention is discussed specifically with reference to documents, one skilled in the art will appreciate that the present invention is useful in other contexts as well, such as with any object that may be indexed for searching purposes. For example, a graphical object, such as an electrical drawing, that contains symbolic information, such as bitmaps of transistors and NAND gates, can be indexed in a content-index using graphical bitmaps. A content-index search system for these graphical objects determines matches by searching the object contents for the presence of the indexed graphical bitmap, for example, by searching for a pattern of bits. In a similar manner, any content-index that indexes a collection of objects is subject to the methods and systems of the present invention as long as a content-index search system is implemented.

Figure 3:
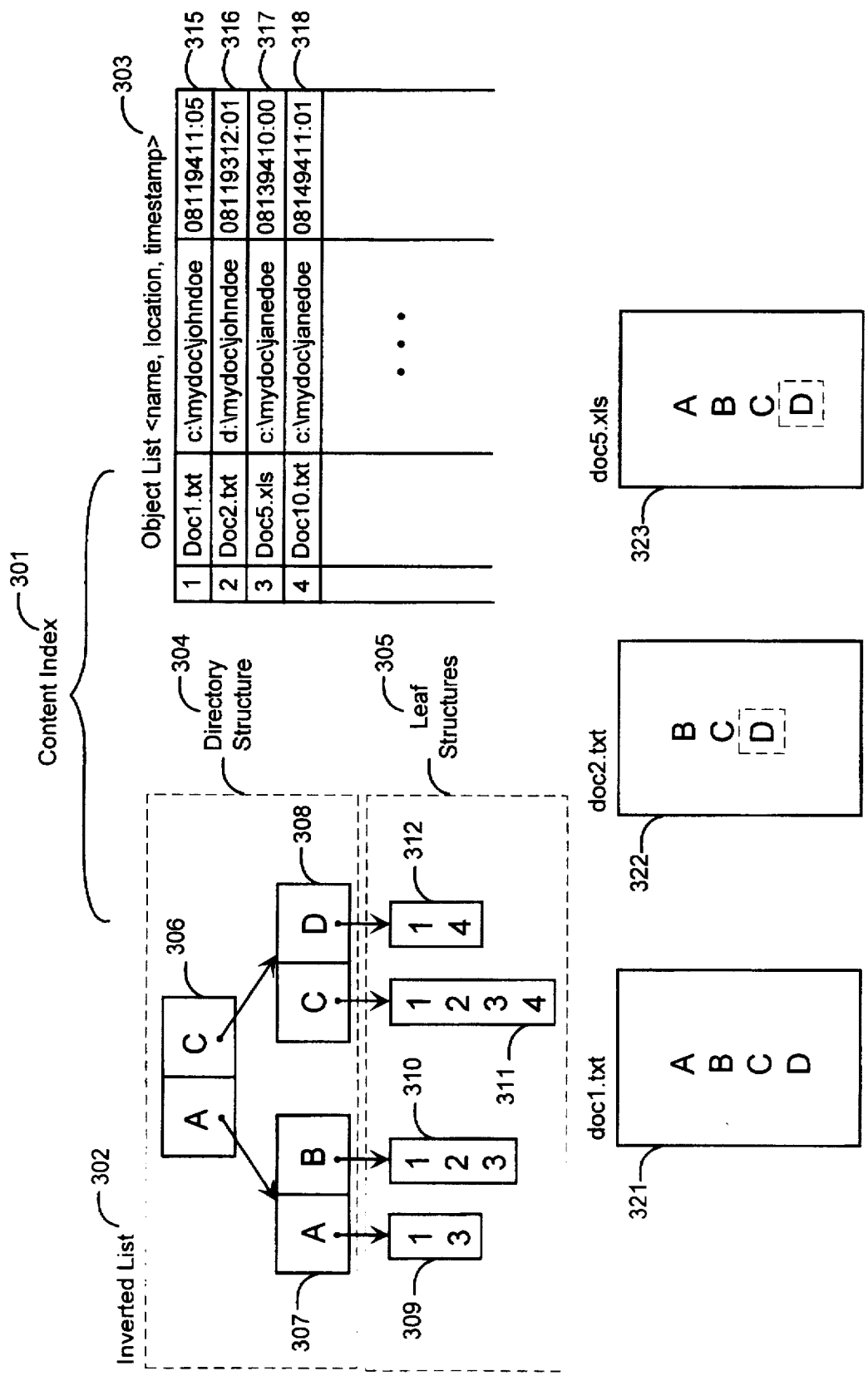
FIG. 3 illustrates a typical implementation of a content-index for a collection of documents.

FIG. 3 illustrates a typical implementation of a content-index for a collection of documents. The documents shown in FIG. 3 are those discussed with reference to FIG. 2. The content-index 301 is shown after it has been generated to index the "doc1.txt" document 321, the "doc2.txt" document 322, and the "doc5.xls" document 323, but before it has been updated to reflect the most recent contents of documents 321, 322, and 323. The content-index 301 comprises an inverted list 302 and an object list 303. The inverted list 302 is arranged such that it efficiently stores the indexing terms and the references to the documents that contain each term. In a typical implementation such as that shown in FIG. 3, the inverted list 302 comprises a directory structure 304, which contains the indexing terms, and leaf structures 309–312, which contain the references to the indexed documents. The directory structure 304 stores the indexing terms (or other indexing information) in a data structure that allows efficient location of the desired term. For example, directory structure 304 is shown implemented as a B-tree, which contains three nodes: node 306, node 307, and node 308. The letters "A," "B," "C," and "D" represent the indexing terms. The leaf structures 309–312 each contain references to the documents that contain the indicated indexing term.

Consider, for example, document 321 and document 323, which both contain the term "A." Node 307 in the directory structure 304 contains an entry for the indexing term "A." This entry points to leaf structure 309, which contains references to two documents labeled "1" and "3." In the particular implementation shown, the leaf structures 309–312 point to a centralized list of documents for the entire content-index (object list 303) to avoid storing large or redundant amounts of information in the leaf structures themselves. Thus, the references to a document "1" and a document "3" in the leaf structure 309 indicate which documents in the object list 303 contain the indexing term. Specifically, leaf structure 309 indicates that the document referred to by the first entry 315 in object list 303 contains indexing term "A" and that the document referred to by the third entry 317 in object list 303 also contains the indexing term "A." The object list 303 also contains additional information regarding each object (document) that is indexed by the inverted list 302. As shown, object list 303 contains in each entry the name of the object, the location of the object, and a timestamp indicating the last time the object was updated. By examining the referred to entries in object list 303, the names and locations of the documents containing the indexing term "A" can be retrieved. Thus, the first entry 315 refers to the document "doc1.txt" 321 and the third entry 317 refers to the document "doc5.xls," both of which contain the term "A."

A content-index such as that discussed in conjunction with FIG. 3 is used to generate the contents of the search result list box 202 of the File Open dialog 201 in FIG. 2. When the user presses the "Find Now" button 204, the code that implements the File Open dialog invokes the content-index search system, which uses the directory structure 304 of the inverted list 302 to find the node(s) that correspond(s) to the one or more search criteria (search terms) specified in edit field 203. When a term is located in the directory structure 304, the leaf structure associated with the corresponding node is examined to retrieve the references to the documents that contain that indexing term. With respect to the example of FIG. 2, the content-index search system uses the content-index to find all of the documents that contain the term "C" and the term "D." As seen in the inverted list 302, the documents referred to by references "1" and "4" match this search criteria, and the documents "doc1.txt" 321 and "doc10.txt" are referred to by to entries 1 and 4 in the object list 303. Once the document references have been retrieved, the content-index search system generates fully qualified names (pathnames) of the documents by examining the proper entries from object list 303 and then stores the pathnames as an initial search result. Thus, the initial search result contains the names "c:\mydoc\johndoe\doc1.txt" and "c:\mydoc\janedoe\doc10.txt."

Note, however, that this initial search result is incorrect as seen by examining the illustrated contents of documents 321, 322, and 323. Specifically, the document "doc10.txt" is no longer part of the collection. Also, the documents "doc2.txt" 322 and "doc5.xls" 323 have been modified since the content-index 301 was last updated and now match the search criteria because they both contain the terms "C" and "D." (The terms that have been added to the modified documents are bordered by dashed lines.) Thus, the search result correction routines of the present invention are invoked to correct the initial search result. Specifically, the search result correction routines determine that the document "c:\mydoc\janedoe\doc10.txt" is no longer part of the collection and remove the reference to this document from the initial search result. In addition, the search result correction routines determine that documents 322 and 323 have been modified since the time indicated by the timestamp contained in the content index entries 316 and 317, which correspond to these documents. Each of these modified documents is then directly examined to determine whether it matches the search criteria. After determining that documents 322 and 323 now match the search criteria, the search result correction routines add references to the documents "c:\mydoc\johndoe\doc2.txt" and "c:\mdoc\janedoe\doc5.xls" to the initial search result. The code that implements the File Open dialog then displays the corrected search result in search result list box 202.

One skilled in the art will recognize that the corrected search result displayed in list box 202 can be incrementally generated and the incremental changes can be displayed as they are determined. Alternatively, all of the corrections to the initial search result can be determined before updating the displayed list. Other similar variations are also possible in conjunction with the methods and systems of the present invention.

In preferred embodiments, the methods and systems of the present invention are implemented on a computer system comprising a central processing unit, a display, a memory, and input/output devices. Preferred embodiments are designed to operate in an operating system environment such as the Microsoft Windows environment defined by Microsoft Corporation in Redmond, Wash. One skilled in the art will recognize that embodiments of the present invention can be practiced in other operating system environments.

Figure 4:
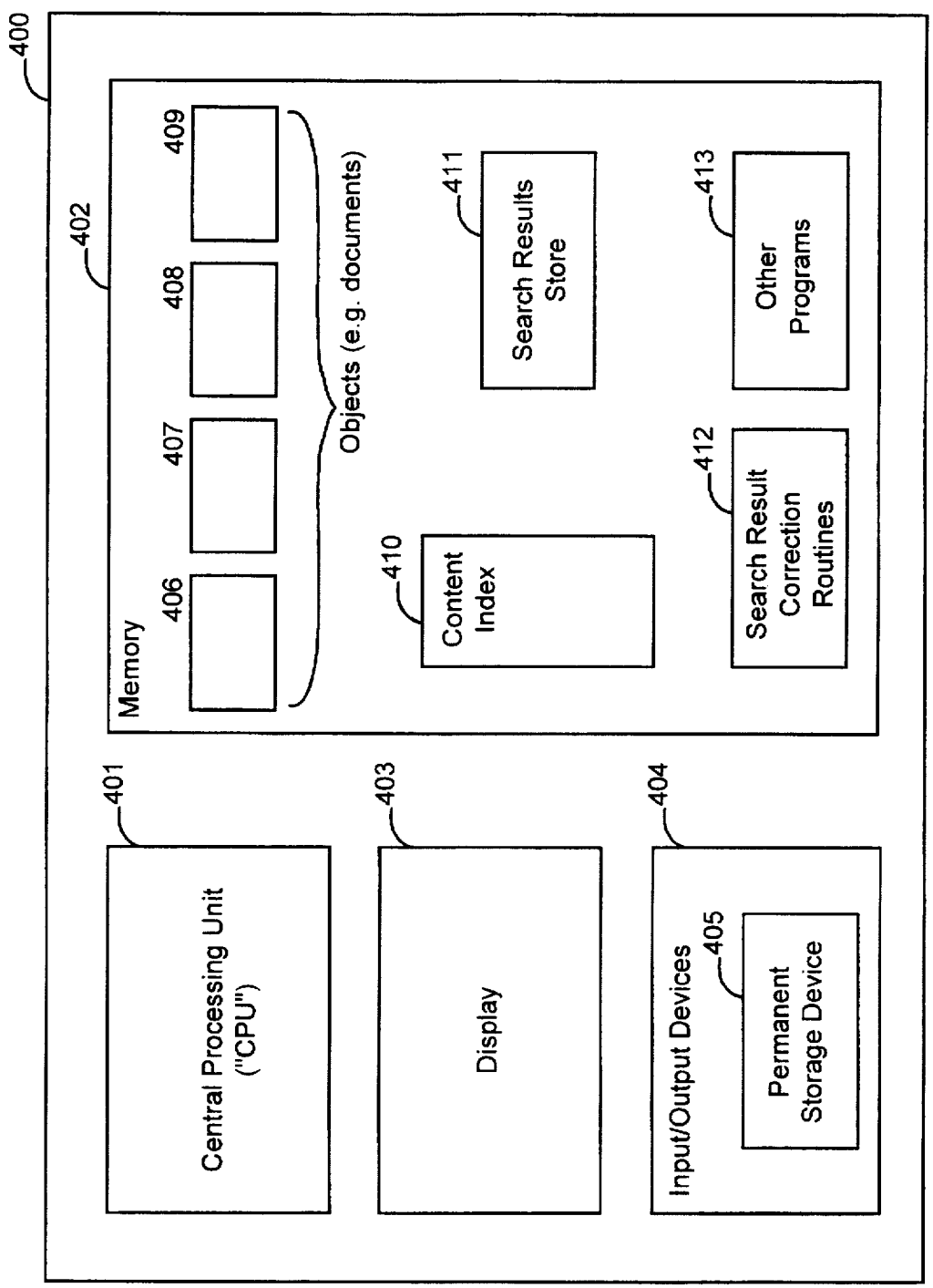
FIG. 4 is a block diagram of a general purpose computer for practicing preferred embodiments of the present invention.

FIG. 4 is a block diagram of a general purpose computer for practicing preferred embodiments of the present invention. The computer system 400 contains a central processing unit (CPU) 401, a display screen (display) 403, input/output devices 404, and a computer memory (memory) 402. The search result correction routines and the code used to store a content-index and the initial search results preferably reside in the memory 402 and execute on at least one CPU such as the CPU 401. The search result correction routines 412 are shown residing in the memory 402 along with other programs 413, such as the content-index search system. A content-index, such as that described with reference to FIG. 3, is shown as content-index 410 also residing in the memory 402. A search result, when generated in response to a query, is shown also in the memory 402 as search results store 411. The memory 402 is also shown containing the objects 406, 407, 408, and 409, which are indexed by the content-index 410. Alternatively, these objects and various parts of the context index 412 may reside on an input/output device 404 such as permanent storage device 405. Although the computer system 400 is shown as a single computer, one skilled in the art would appreciate that the present invention may be practiced on processing systems with varying architectures, including networked environments, multiprocessor environments, and on systems with hardwired logic.

Figure 5:
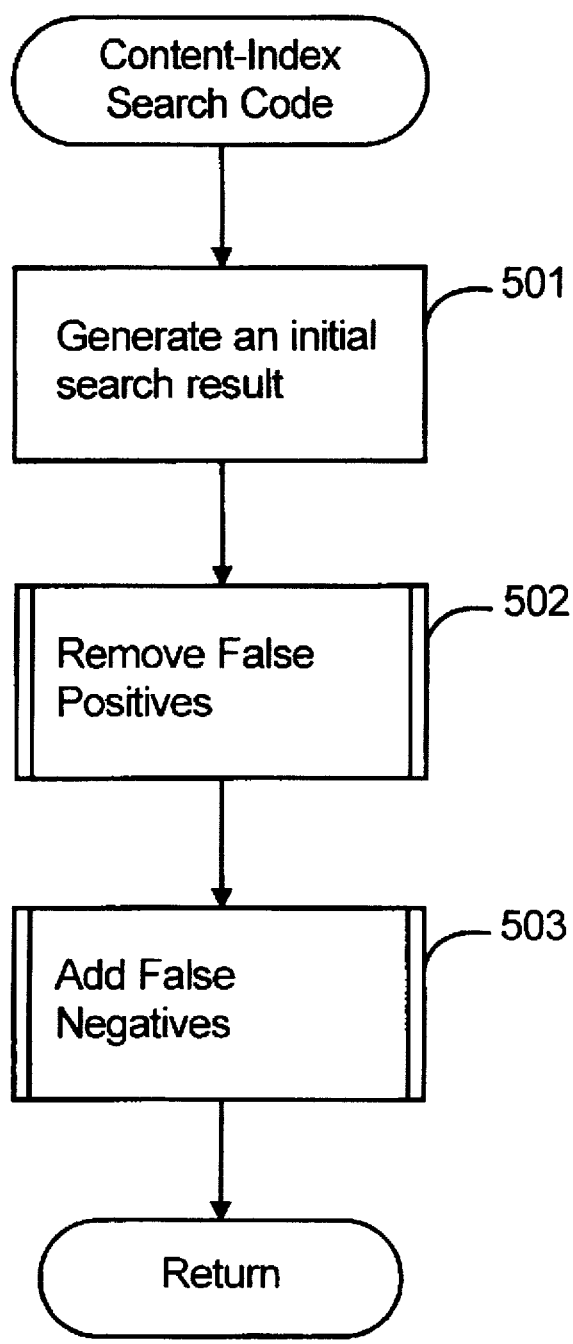
FIG. 5 is an overview flow diagram of the content-index search code of the present invention.

In one aspect of the invention, a preferred embodiment provides a content-index search system (program, or code module) for carrying out the methods of the present invention. FIG. 5 is an overview flow diagram of the content-index search code of the present invention. The content-index search code takes as input, a search criteria. The content-index search code generates an initial search result and then invokes routines to correct the search result. Specifically, in step 501, the content-index search code generates an initial search result using the appropriate content-index or indices. As will be discussed further below, if the collection of objects is only partially indexed, then generating the initial search result may involve examining the objects themselves to determine whether the non-indexed objects match the search criteria. In step 502, the code invokes a search result correction routine to remove references from the initial search that correspond to false positive results, as will be discussed with reference to FIG. 6. In step 503, the code invokes a search result correction routine to add references that correspond to false negative results, as will be discussed further below in conjunction with FIGS. 7 and 8, and returns.

One skilled in the art will recognize that the search result correction routines for removing false positive results and for adding false negative results need not be executed in the order shown in FIG. 5. More specifically, in embodiments that support parallel processing or threaded processes, the routines may be to some extent executable in parallel or as separate threads. Also, the routines could be executed in reverse order. Different variations are possible depending upon the optimizations desired.

Figure 6:
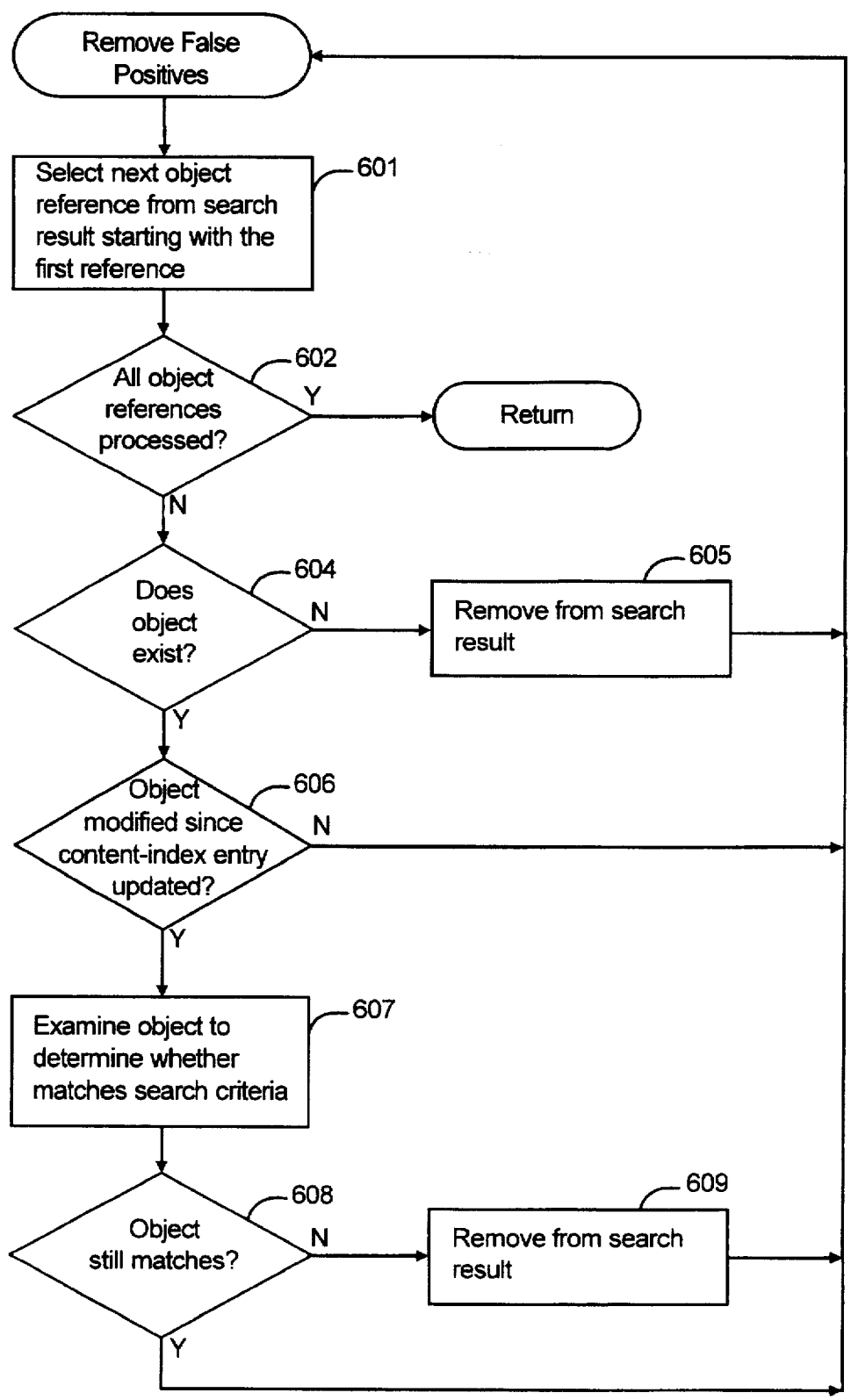
FIG. 6 is a flow diagram of a search result correction routine for removing false positive results.

FIG. 6 is a flow diagram of a search result correction routine for removing false positive results. The routine removes from the stored search result references to objects that no longer exist in the collection and references to objects that were modified since they were last indexed by the content-index and no longer match the search criteria. In step 601, the routine selects the next object reference from the stored search result beginning with the first reference. In step 602, the routine determines whether all the references have been processed and, if so, returns, otherwise continues in step 604. In step 604, the routine determines whether the object referred to still exists in the collection and, if not, continues in step 605, otherwise continues in step 606. In step 605, the routine removes from the stored search result the reference to the object that no longer exists and continues at the beginning of the loop in step 601. In step 606, the routine determines whether the object referred to by the selected reference has been modified since the content-index entry that corresponds to the object was last updated. If the object has been so modified, the routine continues in step 607, else continues at the beginning of the loop to select the next reference from the stored search result.

There are many ways to determine whether a referred to object has been modified since the object was last indexed. One way is to compare the timestamp stored in the object list entry for that object with the last modification time associated with the object in the collection. Well-known mechanisms exist for obtaining the last modification time associated with the object. For example, if the object is stored in a file, the file may have a "last modification time" file attribute property that is retrievable from the file system. A second way to determine whether a referred to object has been modified since the object was last indexed, if indexed objects are referred to directly by the leaf structures (instead of a centralized object list), is to check a timestamp stored with each reference to the object in the leaf structures to determine whether the timestamp is older than the last time the object in the collection was modified. A third way to determine whether a referred to object has been modified since the object was last indexed, in an embodiment where a single timestamp is associated with updating the entire content-index, is to compare this single timestamp with the last modification time associated with the object. One skilled in the art will recognize that these different implementations involve different trade-offs and some implementations are more efficient than others.

Once it is determined that the object has been modified, in step 607, the routine examines the modified object by performing a direct search of the contents of the object to determine whether the object still matches the search criteria. In step 608, if the routine determines that the object still matches the search criteria, it leaves the reference to the object in the stored search result and continues at the beginning of the loop in step 601 to select the next reference. If instead the object no longer matches the search criteria, the routine continues in step 609. In step 609, the reference to the object is removed from the stored search result and the routine returns to the beginning of the loop at step 601.

Figure 7:
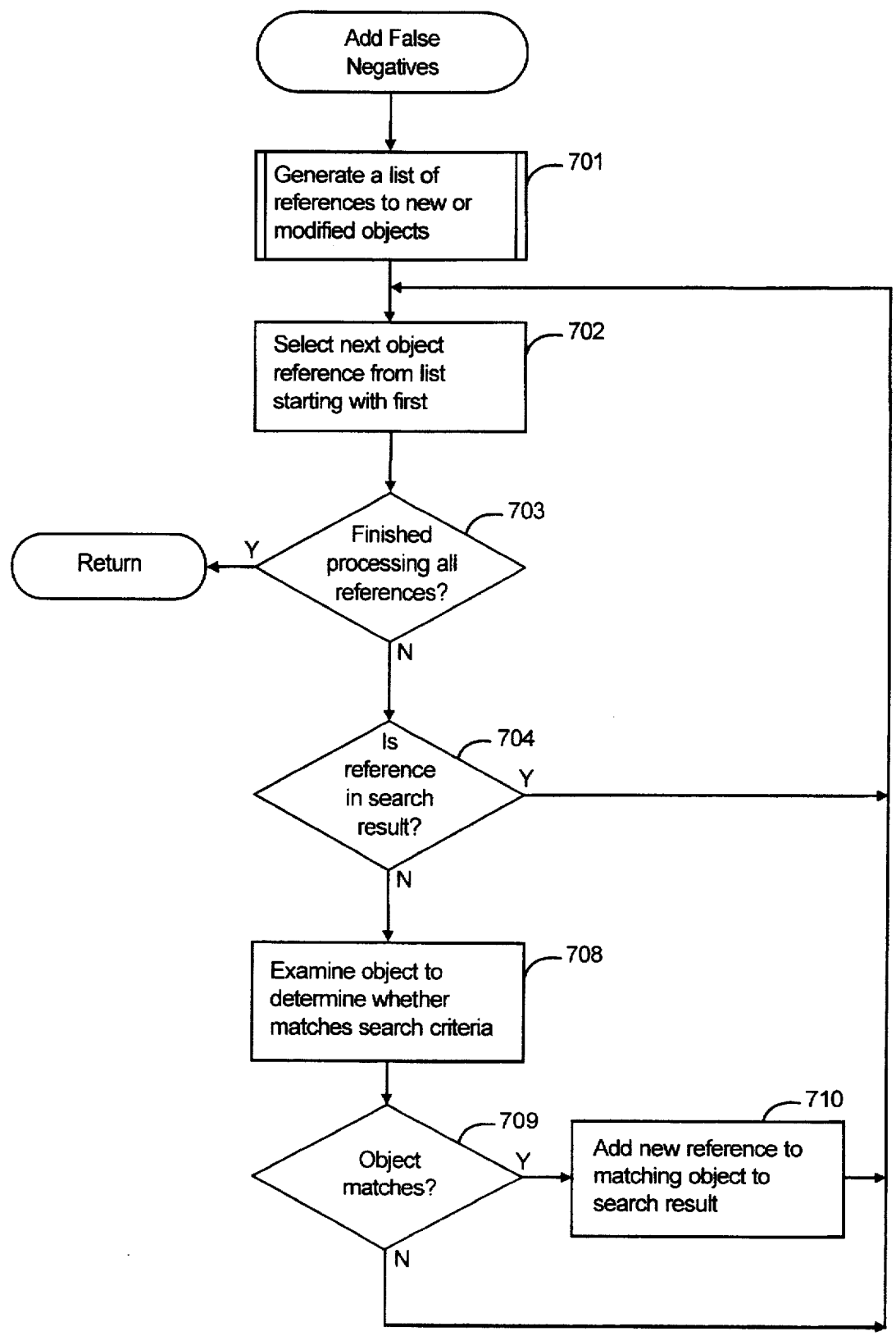
FIG. 7 is a flow diagram of the search result correction routine for adding false negative results.

FIG. 7 is a flow diagram of the search result correction routine for adding false negative results. The routine first determines the references to objects that have been added to the collection of objects or modified since the content-index was last updated. These new and modified references constitute potential additions to the search result. Next, the routine determines whether the objects referred to by these potential additions match the search criteria and have not yet been included in the stored search result and, if so, adds references to these objects to the stored search result. Specifically, in step 701, the routine generates a list of references to objects that have been newly added or modified (the potential additions list). This step is discussed in more detail below in conjunction with FIG. 8. In steps 702–710, the routine uses this potential additions list to determine which objects match the search criteria. In step 702, the routine selects the next reference from the potential additions list starting with the first reference. In step 703, the routine determines whether it has processed all the references in the list and, if so, returns, otherwise continues in step 704. In step 704, the routine determines whether the selected reference is already in the stored search result and, if so, returns to the beginning of the loop at step 702, because the reference is already correctly contained in the stored search result. If, however, the selected reference is not in the stored search result, then the routine continues in step 708 to examine the referred to object to determine whether the object matches the search criteria. In step 709, if the object matches the search criteria, then the routine continues in step 710, else the routine returns to the beginning of the loop in step 702 because the non-matching reference should not be added to the stored search result. In step 710, the routine adds the reference to the matching object to the stored search result and returns to the beginning of the loop in step 702.

Figure 8:
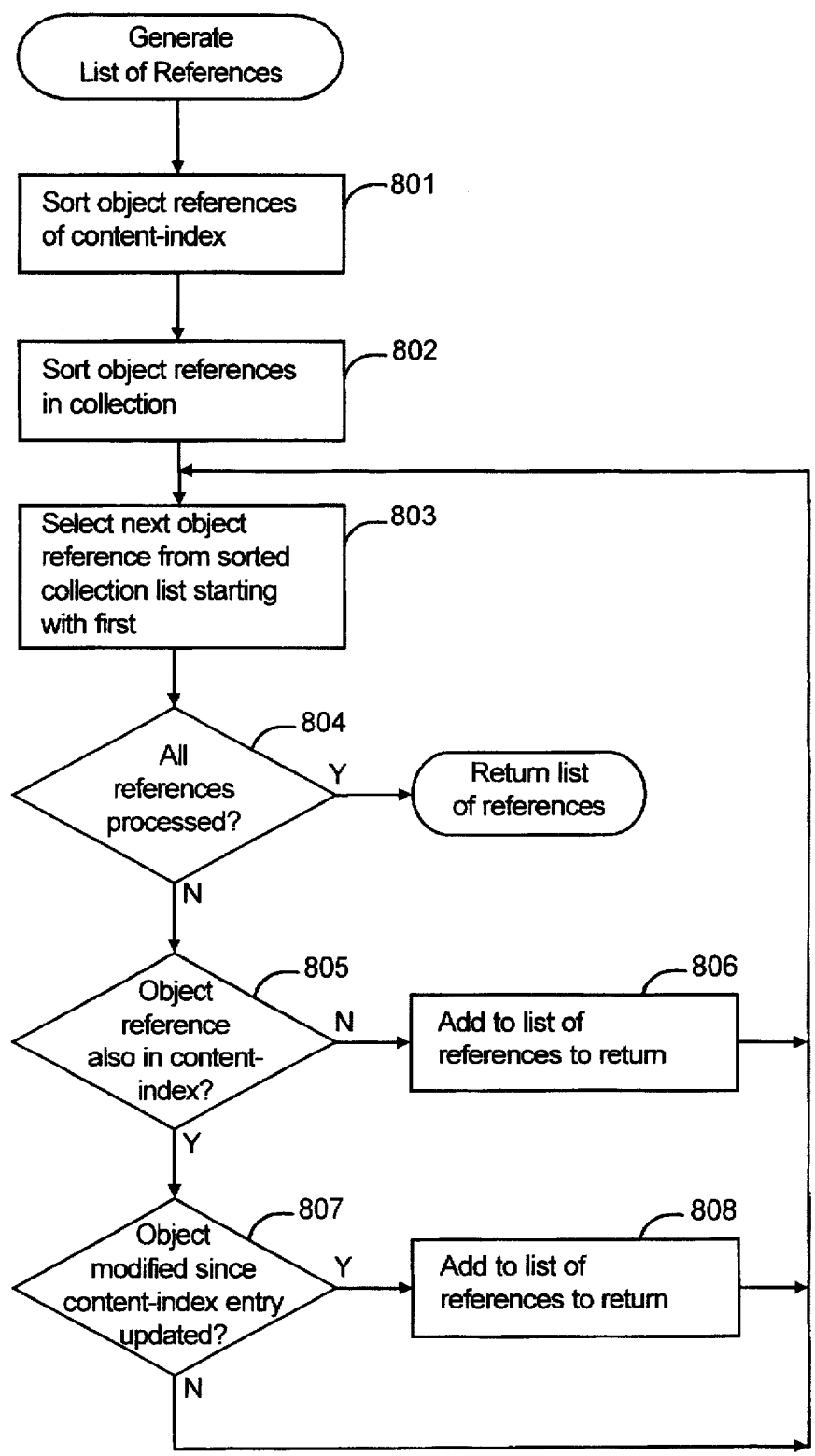
FIG. 8 is a flow diagram of a routine that generates a list of references to new or modified objects.

FIG. 8 is a flow diagram of a routine that generates a list of references to new or modified objects. The steps in this routine determine what objects have been added to the collection since the content-index was last updated and what objects have been modified since their corresponding entries in the content-index were last updated. In particular, in step 801, the routine sorts the references to the indexed objects stored in the content-index. Similarly, in step 802, the routine sorts a list of the objects contained in the collection. Steps 801 and 802 provide greater efficiency in executing the remaining steps; however, one skilled in the art will recognize that these sorting steps are optimizations and need not be executed. In steps 803–808, the routine compares the sorted references to indexed objects with the sorted list of objects in the collection to determine the new and modified objects. Specifically, in step 803, the routine selects a reference to the next object from the sorted list of objects contained in the collection starting with the first reference. In step 804, the routine determines whether it has processed all of the objects in the collection and, if so, returns to the calling routine a list of references to the new or modified objects. Otherwise, the routine continues in step 805. In step 805, the routine determines whether the selected object in the collection has been indexed by the content-index and, if not, continues in step 806, otherwise continues in step 807. In step 806, because the object is not yet indexed by the content-index, the routine adds a reference to the object to the list of references to return to the calling routine and returns to the beginning of the loop at step 803. In step 807, because the object is indexed, the routine determines whether the object has been modified since the corresponding content-index entry was updated and, if so, continues in step 808, otherwise returns to the beginning of the loop in step 803 and ignores the already correct reference in the stored search result. As discussed earlier in conjunction with FIG. 6, one embodiment determines whether the object has been modified since the content-index was last updated by comparing the timestamp stored in the object list of the content-index (see FIG. 2) with the last modification date associated with the object in the collection. In step 808, because the object has been modified, the object is preferably directly searched to determine whether the object matches the search criteria. Thus, in step 808, to enable a direct search, the routine adds a reference to the modified object to the list of references to return to the calling routine and returns to the beginning of the loop in step 803.

Figure 9:
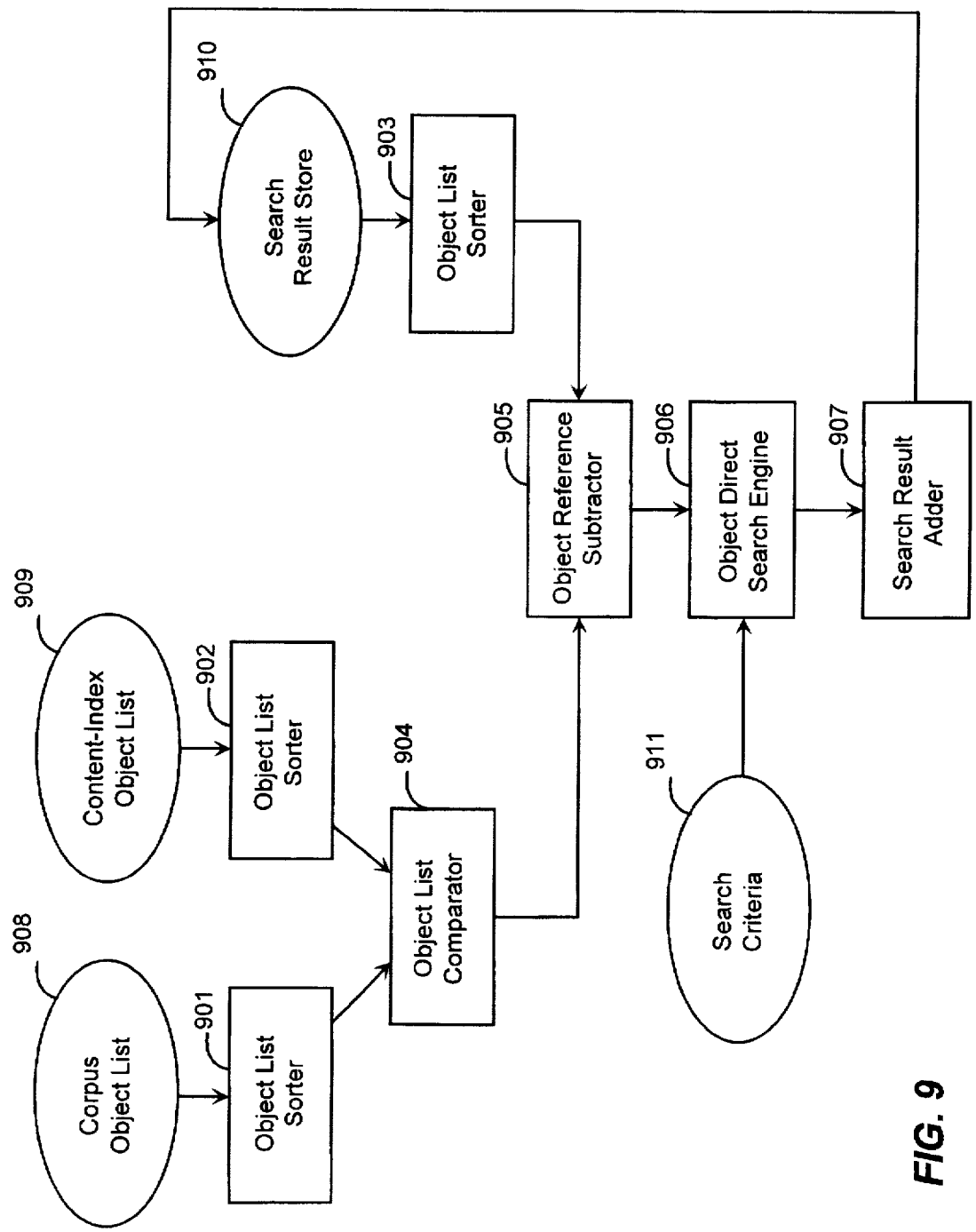
FIG. 9 is a data flow diagram of a system embodiment for adding false negative results to a search result initially generated by a content-index search engine.

FIG. 9 is a data flow diagram of a system embodiment for adding false negative results to a search result initially generated by a content-index search engine. The ovals shown in FIG. 9 indicate initial data supplied to the components of the system and the rectangles indicate the various components of the system. The arrows indicate data that is passed between the components of the system or data that is initially received by a component. The system comprises seven components 901–907. As discussed earlier with reference to FIG. 1, the content-index search engine (indicated as the content-index search code 102 in FIG. 1) initially generates and stores a search result 910 using a content-index. This initial search result is passed as input to the object list sorter 903 to generate a sorted list of the references contained in the stored search result, which is then passed as input to the object reference subtractor 905. Similarly, a list of objects in the object collection 908 is passed as input to an object list sorter 901 to generate a sorted list of references to objects in the collection, which is then passed as input to the object list of comparator 904. Also, similarly, the object list of the content-index 909 is passed as input to an object list sorter 902 to generate a sorted list of references to the objects of the collection that are indexed by the content-index, which is then passed as input to the object list comparator 904. The object list comparator 904 compares the sorted list of references to objects contained in the collection with the sorted list of references to the objects indexed by the content-index to generate a list of references to objects that have not yet been indexed by the content-index and references to objects that have been modified since they were last indexed by the content-index. Methods for performing such a comparison were discussed with reference to FIGS. 6 and 8. This list of references to new or modified objects is passed as input to the object reference subtractor 905. The object reference subtractor 905 compares the list of new or modified objects to the sorted list of the references contained in the stored search result to generate a list of references to objects that are new or have been modified but not yet included in the stored search result. This list is then passed as input to the object direct search engine 906. The object direct search engine 906 also takes as input the search criteria 911 and performs a search on each object referred to in the list of references to objects that are new or have been modified but not yet included in the stored search result to determine whether the object meets the search criteria. The object direct search engine 906 then passes a list of references to the objects that match the search criteria to the search result adder 906. The search result adder 906 then adds a reference to each of these matching objects back into the stored search result 910.

Figure 10:
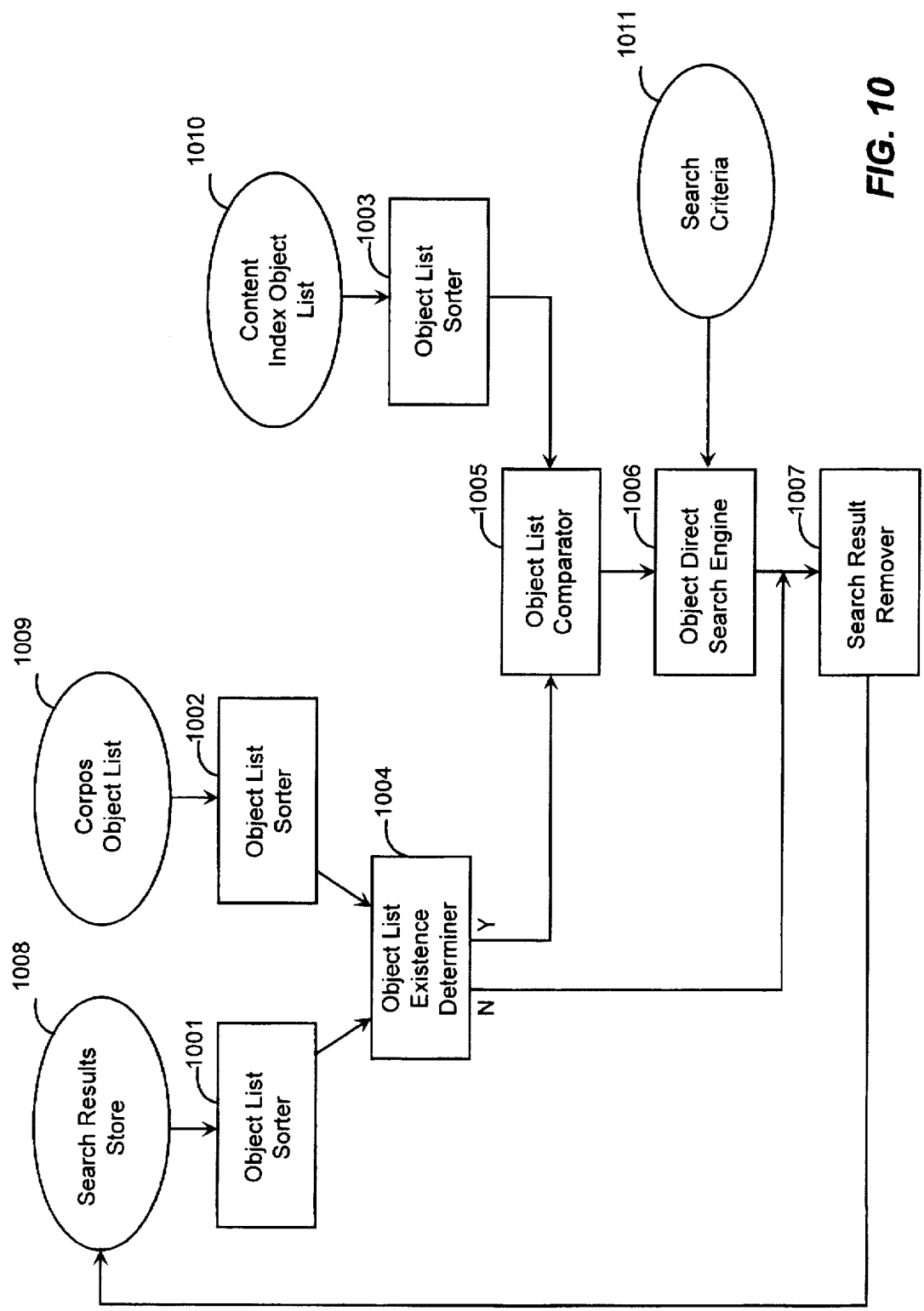
FIG. 10 is a data flow diagram of a system embodiment for removing false positive results from a search result initially generated by a content-index search engine.

FIG. 10 is a data flow diagram of a system embodiment for removing false positive results from a search result initially generated by a content-index search engine. The system comprises seven components 1001–1007. As discussed earlier with reference to FIG. 1, the content-index search engine (indicated as the content-index search code 102 in FIG. 1) initially generates and stores a search result 1008 using a content-index. The initial stored search result 1008 is input to the object list sorter 1001 to generate a sorted list of the references contained in the initial search result 1008, which is then passed as input to the object list existence determiner 1004. Similarly, a list of the objects contained in the object collection 1009 is passed as input to object list sorter 1002 to generate a sorted list of references to objects in the collection, which is then passed as input to the object list existence determiner 1004. Also, similarly, the object list of the content-index 1010 is passed as input to an object list sorter 1003 to generate a sorted list of references to objects indexed by the content-index which is then passed as input to the object list comparator 1005. The object list existence determiner 1004 compares the sorted list of references to objects contained in the stored search result with the sorted list of references to objects in the collection to generate two lists of references to objects. The first list is a list of objects that are referred to in the stored search result 1008 and that also exist in the collection of objects. This first list is passed as input to the object list comparator 1005. The object list existence determiner 1004 also generates a second list of references to objects that are referred to in the stored search result 1008 but that no longer exist in the collection of objects. This second list is passed as input to the search result remover 1007. The object list comparator 1005 compares the list of references to objects that are part of the stored search result and that do exist with the list of references to objects that are indexed by the content-index to generate a list of references to objects that have been modified since the content-index object list 1010 was last updated. Alternatively, a list of references to objects that have been modified since the content-index object list 1010 was last updated can be generated directly from the search result 1008 if a timestamp that indicates when the object was last indexed is stored in the search result 1008 when the initial search result is generated. Storing timestamps in the search result 1008 thus avoids the need for the object list sorter 1003 and the object list comparator 1005. Either way, the list of references to modified objects is then passed as input to the object direct search engine 1006. The object direct search engine 1006 takes as input data the search criteria 1011 and examines each object referred to in the list of modified objects to determine whether the object still matches the search criteria. The object direct search engine 1006 passes a list of objects that have been modified and no longer match the search criteria as input to the search result remover 1007. The search result remover 1007 then removes from the stored search result 1008 the references corresponding to the list of objects that no longer match the search criteria.

The above discussion of embodiments of the methods and systems of the present invention has assumed that the collection of objects is completely indexed by the content-index. One skilled in the art will realize that other embodiments are possible. For example, in one alternative embodiment, the collection of objects is only partially indexed by the content-index. According to this embodiment, there is a content-index inclusion rule that indicates whether a particular object is indexed by the content-index. The portion of the collection indexed is referred to as the domain of the content-index. The methods and systems described above with reference to FIGS. 1 through 10 are slightly modified to incorporate partial indexing. In particular, the generation of the initial search result using the content-index is slightly modified as well as the search correction routines for removing false positive results and for adding false negative results.

Specifically, in step 501 of FIG. 5, the code that generates the initial search result is modified to preferably first use the content-index to efficiently generate an initial search result and to then directly search the remaining objects in the collection that are not in the domain of the content-index for additional objects that match the search criteria. Then, the code adds the references generated from the direct search to the initial search result. Also, according to this embodiment, it is preferable that a flag be included with each reference in the stored search result to indicate whether the reference was placed in the stored search result as a result of a direct search of the object as opposed to as a result of a search using the content-index. This flag is used for optimization purposes to avoid unnecessary searching of the object in the search result correction routines. One skilled in the art will recognize that the inclusion of such a flag is not necessary and that other implementations of preserving such information are possible.

Figure 11:
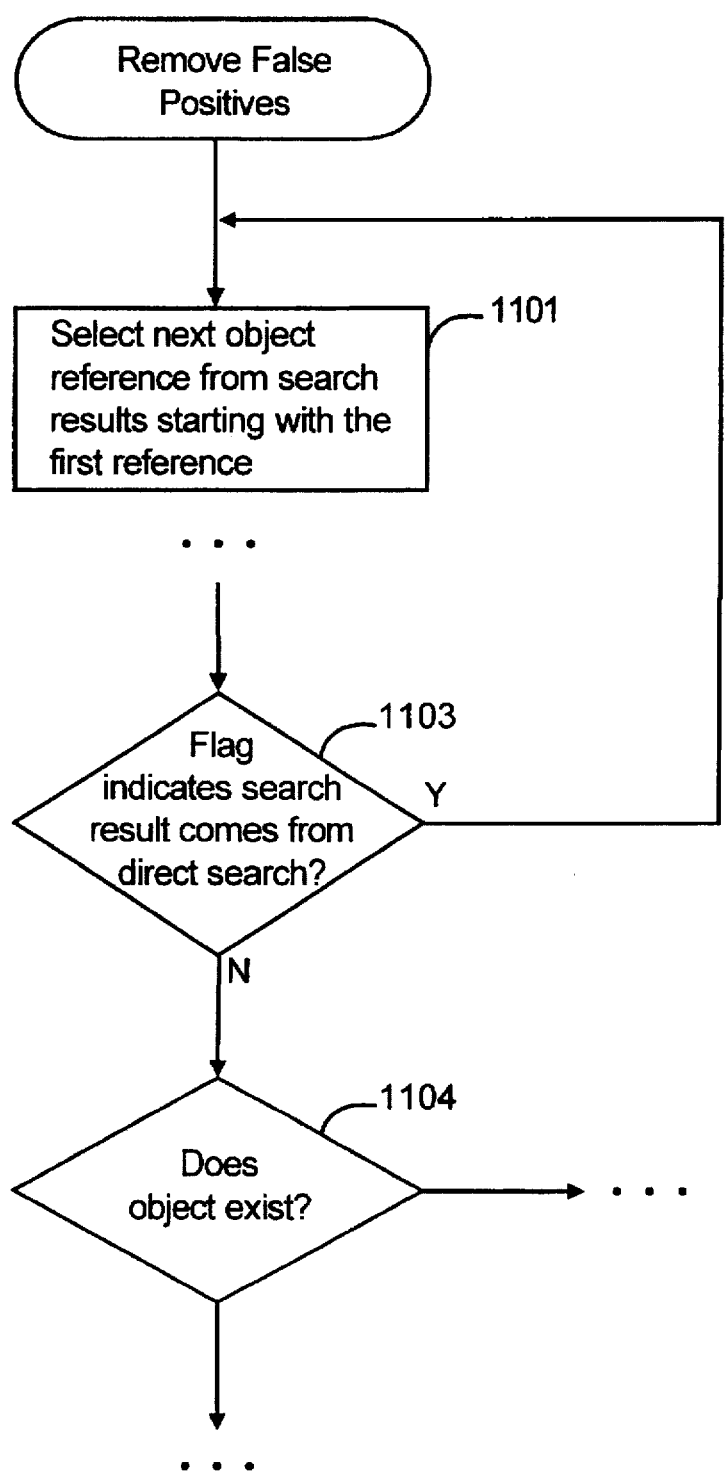
FIG. 11 is a partial flow diagram of the modifications to the search correction routine for removing false positive results when using partial content-indexing.

FIG. 11 is a partial flow diagram of the modifications to the search correction routine for removing false positive results when using partial content-indexing. A new step 1103 is added between steps 602 and 604 in FIG. 6 to avoid a direct search of those objects referred to in the stored search result that have already been examined. Specifically, in step 1103, if the flag for the selected reference in the stored search result indicates that the reference was added to the stored search result as a result of a direct search of the object, then the routine returns to step 601 to select the next object reference from the stored search result. Otherwise, the routine continues in step 604 to determine whether the object referred to by the selected reference exists in the collection of objects.

Figure 12:
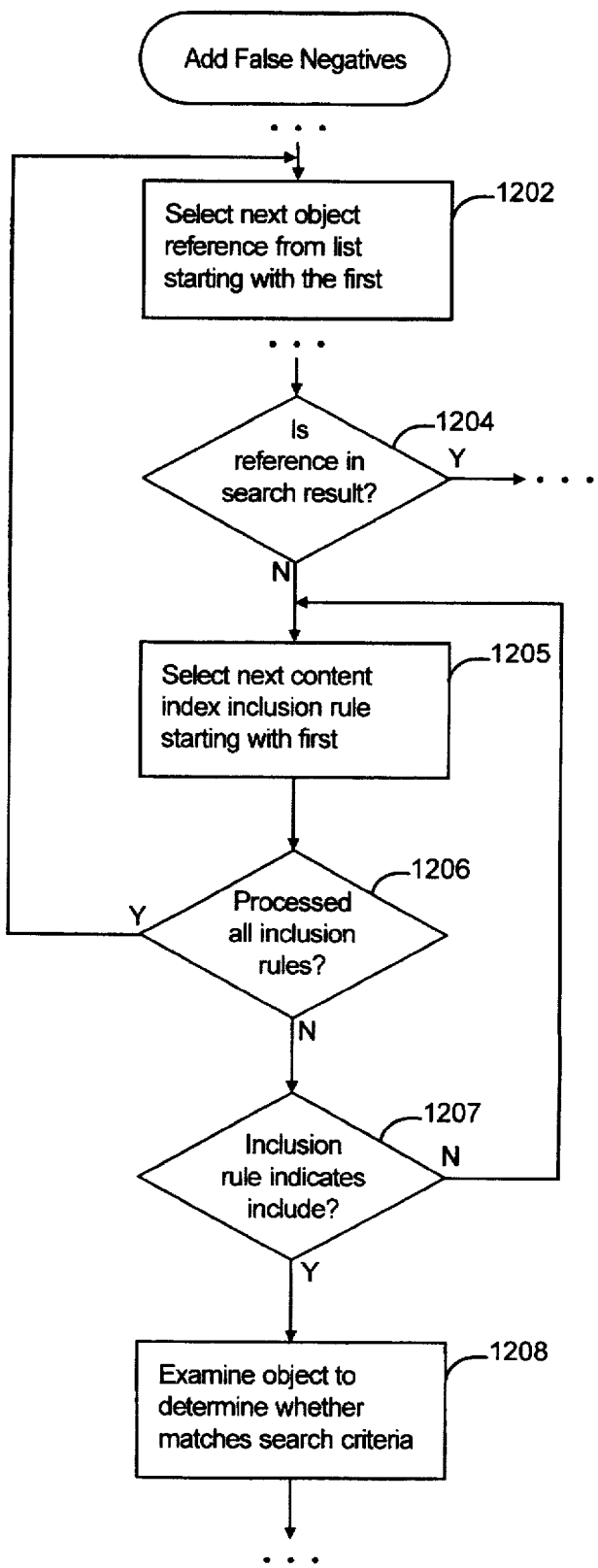
FIG. 12 is a partial flow diagram of the modifications to the search result correction routine for adding false negative results when using partial indexing.

FIG. 12 is a partial flow diagram of the modifications to the search result correction routine for adding false negative results when using partial indexing. The modifications to this routine involve determining whether any of the references to new or modified objects (potential additions) are not part of the domain of the content-index to efficiently determine whether the object matches the search criteria. Specifically, a test is added between step 704 and step 708 of FIG. 7 to determine whether the object referred to by the selected reference is in the domain of the content-index. This determination is performed using the content-index inclusion rule. This test is placed after checking for references that are already included in the stored search result, in order to conclude that if the object is not included in the domain then by definition it does not match the search criteria because the loop would already have been exited by first detecting that the object was referred to in the stored search result.

As shown in FIG. 12, multiple steps have been added to the routine of FIG. 7. These steps accommodate another alternative embodiment that uses multiple content-indices to index a particular collection of objects. At this point, let it suffice in FIG. 12 to note that multiple content-indices can be used in conjunction with the embodiment of partial indexing such that each content-index is checked as needed to determine whether the new or modified object is included in the domain of at least one content-index. Once the routine determines that the new or modified object is included in the domain of at least one content-index, then in step 1208 the referred to object is examined to determine whether it matches the search criteria.

Similar to a partially indexed collection, in the alternative embodiment that employs multiple content-indices to index a collection of objects, each content-index has a corresponding content-index inclusion rule for determining whether a particular object is in the domain of that content-index. According to this embodiment, several modifications are made to the code for generating the initial search result and to the routines for removing false positive results and for adding false negative results to accommodate multiple content-indices. In particular, step 501 of FIG. 5 is modified to generate the initial search result using all of the content-indices for that particular collection of objects.

Similarly, step 606 of FIG. 6, which determines whether a referred to object has been modified since the content-index was last updated, preferably checks all of the content-indices to determine whether the object is modified. One would appreciate that several methods for performing these checks are possible. For example, if the domains of the content-indices are mutually exclusive, then as soon as the object is found in one of the content-indices and the appropriate timestamp retrieved, then the remainder of the content-indices need not be examined. Also, the content-index inclusion rules for each of the content-indices could be examined until the appropriate content-index is found. Then, the appropriate content-index is searched.

As briefly discussed in conjunction with partial indexing, the search correction routine for adding false negative results is also modified. In particular, as shown in step 1205 of FIG. 12, the next content-index inclusion rule is selected. Then in step 1206, if all of the content-index inclusion rules have been processed, the routine returns to the beginning of the loop at step 702 of FIG. 7 (shown as step 1202). If, on the other hand, there are more inclusion rules to process, then the routine continues in step 1207. If the selected inclusion rule indicates that the object referred to by the selected reference is to be included in the domain of the content-index governed by the selected inclusion rule, then the routine continues at step 1208 to examine the referred to object to determine whether it matches the search criteria. Otherwise, if the selected inclusion rule indicates that the referred to object is not included in the domain of the content-index governed by the selected inclusion rule, then the routine continues in step 1205 to select the next content-index inclusion rule. This process continues until either one of the inclusion rules indicates that the reference to the new or modified object is in the domain of one of the content-indices or until all of the inclusion rules have been processed. If the referred to object is not included in the domain of any content-index, then the object has already been examined during the initial search result generation and determined not to match the search criteria. One skilled in the art would appreciate that several variations in the logic are possible depending upon whether the content-indices are mutually exclusive and whether partial indexing is allowed.

In addition to the changes to FIG. 7 that are shown in FIG. 12, the generation of the list of new or modified objects (FIG. 8) is preferably modified to compare the references of all the content-indices with the list of objects currently included in the collection (see steps 801 and 805–807 in FIG. 8). It is also preferred that the content-indices sorted in step 801 are sorted together to optimize the comparisons performed in steps 805 and 807.

In yet another embodiment, the methods and systems of the present invention take into account that not all possible searches can be solved using a content-index. The searches that can be solved using a content-index depend upon the information stored in the content-index. For example, a search that involves searching for a particular occurrence of a term in a document is typically not solved using a content-index unless occurrence information is also stored in the content-index. The "Advanced Search" button 205 in FIG. 2, for example, could be used to specify such a search criteria.

For example, a content-index such as that described in conjunction with FIG. 3 could store occurrence information for each reference to a document that contains the indexing term. More specifically, in one embodiment, each reference in each leaf structure 309–312 points to a tuple comprising (reference to document, occurrence$_i$, ... occurrence$_n$) where the "reference to document" is the same as that shown in FIG. 3 (e.g., "1") and each occurrence$_i$ is an occurrence indicator (e.g., a number), which indicates the location of the indexing term within the document. An occurrence number could indicate, for example, that the indexing term is the $i^{th}$ word in the document. For example, the tuples (1, 3, 16) and (3, 5) substituted for leaf structure 309 indicate that the indexing term "A" is found in document "1" as the $3^{rd}$ word and the $16^{th}$ word and in document "3" as the $5^{th}$ word.

Alternatively, if the content-index does not store occurrence information, then a search for a particular location or the $i^{th}$ occurrence of a term in a document is not solvable exclusively using that content-index. In this case, the methods and systems of the present invention are modified to incorporate more complex searches.

Figure 13:
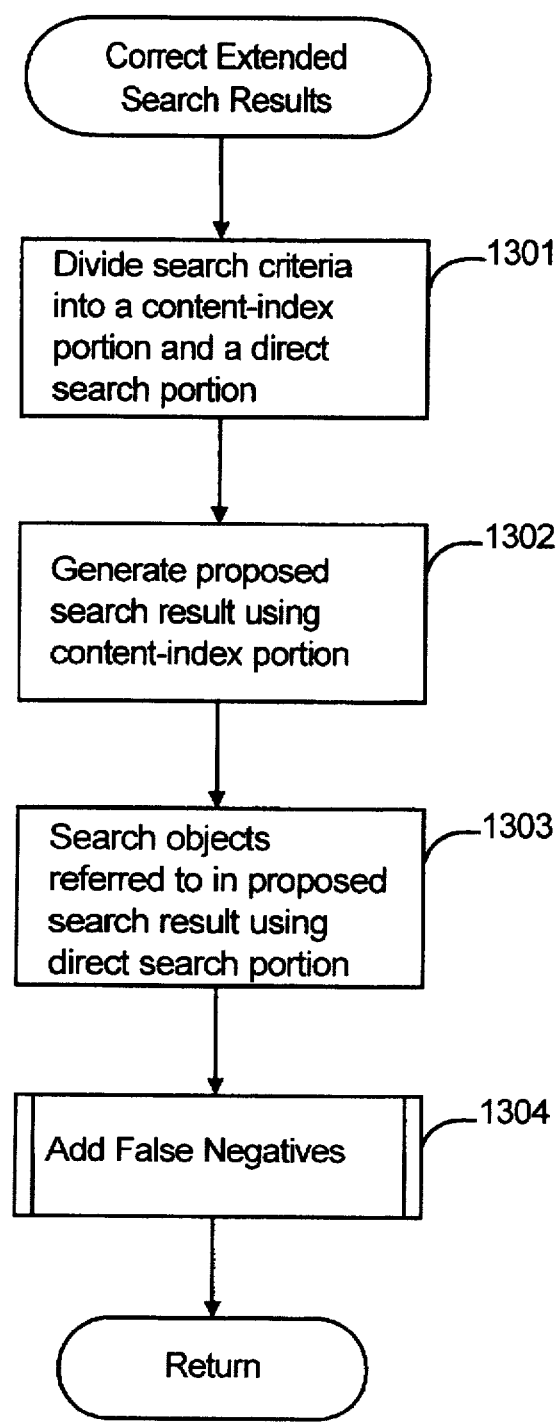
FIG. 13 is a flow diagram of the modifications to the content-index search code of FIG. 5 when used with a search criteria that goes beyond a search solved exclusively using a content-index.

FIG. 13 is a flow diagram of the modifications to the content-index search code of FIG. 5 when used with a search criteria that goes beyond a search solved exclusively using a content-index. Specifically, in step 1301, the search criteria is divided into a content-index portion, which is the portion of the search that can be performed using a content-index, and a direct search portion, which is the portion of the search that requires searching the object directly to determine whether the content of the object matches the search criteria. According to this embodiment, the logical operator that joins the content-index portion of the search criteria and the direct search portion is preferably a conjunction (e.g., a logical AND). That so, the portion of the search that is not solved using the content-index (the direct search portion) further restricts the results of the search generated using the content-index portion. In step 1302, the routine generates a proposed search result using the content-index portion of the search criteria. In step 1303, the routine directly searches each object referred to by the references in the proposed search result for a match using the direct search portion of the search criteria. In step 1303, the routine then removes from the proposed search result the references to objects that do not match the direct search portion. Because the objects in the remaining search result presumably match the search criteria, no false positives preferably remain in the search result. Thus, the search correction routine for removing false positive results need not be invoked. However, the search correction routine for adding false negative results is invoked in step 1304, and then the routine returns.

Although the present invention has been disclosed and described in terms of preferred embodiments, it is not intended that the invention be limited to such embodiments. Modifications within the spirit of the invention will be apparent to those skilled in the art. The scope of the present invention is defined by the claims which follow.

We claim:

1. A method in a computer system for generating a search result that identifies objects that satisfy a search criteria, the computer system having a collection of objects and a plurality of terms, each object containing one or more of the terms, the method comprising the computer-implemented steps of:

creating a content-index that contains, for each of the plurality of terms, a reference to each object that contains the term;

after creating the content-index, updating the collection of objects by adding new objects to the collection, by removing objects from the collection, or by modifying the terms contained by an object, the updating being performed without updating the content-index to reflect the updates to the collection of objects;

searching the content-index to identify objects that satisfied the search criteria before the collection of objects was updated, and storing an indication of each identified object as the search result; and updating the search result to reflect the updated collection of objects by, adding an indication of each object that was added to the collection of objects and that satisfies the search criteria;

removing the indication of each object that was removed from the collection of objects;

adding an indication of each object that was modified and that now satisfies the search criteria; and removing the indication to each object that was modified and that no longer satisfies the search criteria.

2. The method of claim 1 wherein the step of removing an indication of each object that was removed from the collection is determined by examining an object list of the objects referred to in the content-index to determine whether each object referred to by the object list exists in the collection of objects.

3. The method of claim 1, the content-index having a timestamp for each object referred to by the content-index, each timestamp recording a time when the corresponding object was last modified, and wherein the step of removing an indication to each object that was modified and that no longer satisfies the search criteria comprises the substeps of:

for each object referred to in the search result, retrieving a time the object was last modified;

determining whether the time recorded by the timestamp in the content-index for the object is different from the retrieved time;

when it is determined that the time recorded by the timestamp is different from the retrieved time, searching the object to determine whether the object still satisfies the search criteria; and when it is determined that the searched object no longer satisfies the search criteria, removing the indication of the object from the search result.

4. The method of claim 1 wherein the step of adding an indication of each object that was added to the collection of objects and that satisfies the search criteria further comprises the substeps of:

comparing the objects currently in the collection with those objects referred to in the content-index to determine a set of new objects;

searching each new object to determine whether each new object satisfies the search criteria; and when a searched new object satisfies the search criteria, adding an indication of the new object to the search result.

5. The method of claim 1, the content-index having a timestamp for each object referred to by the content-index, each timestamp recording a time when the corresponding object was last modified, and wherein the step adding an indication of each object that was modified and that now satisfies the search criteria comprises the substeps of:

for each object referred to in the content-index, retrieving a time the object was last modified;

determining whether the time recorded by the timestamp in the content-index for the object is different from the retrieved time;

when it is determined that the time recorded by the timestamp is different from the retrieved time, searching the object to determine whether the object satisfies the search criteria; and when it is determined that the searched object satisfies the search criteria, adding an indication of the object to the search result.

6. The method of claim 1 wherein the collection of objects comprises a corpus of documents.

7. A method in a computer system for correcting a search result obtained by searching a content-index to identify objects that match a search criteria, the objects contained in a collection of objects, the content-index containing, for each of a plurality of terms, a reference to an object in the collection that contains the term, the method comprising the computer-implemented steps of:

determining a current state of the collection of objects; and when it is determined that the search result obtained by searching the content-index is out of date relative to the current state of the collection of objects, correcting the search result to reflect updates to the collection of objects since the content-index was last updated without first updating the content-index.

8. The method of claim 7 wherein the step of correcting the search result to reflect updates to the collection removes from the search result indications of objects that, as a result of updating of the collection, no longer match the search criteria and adds to the search result indications of objects that, as a result of updating of the collection, now match the search criteria.

9. The method of claim 7 wherein the step of correcting the search result to reflect updates to the collection removes indications of objects that no longer exist in the collection and removes indications of objects that have been modified and no longer match the search criteria.

10. The method of claim 7 wherein the step of correcting the search result to reflect updates to the collection adds indications to objects that have been added to the collection and match the search criteria and adds indications to objects that have been modified and now match the search criteria.

11. A method in a computer system for updating a search result obtained by searching a content-index to identify objects that match a search criteria, the objects contained in a collection of objects, the content-index partially indexing the collection of objects and containing, for each of a plurality of terms, a reference to an object in the collection that contains the term, the method comprising the computer-implemented steps of:

displaying the search result obtained by searching the content-index;

after displaying the search result obtained by searching the content-index, determining the objects in the collection that are not indexed by the content-index and that match the search criteria;

updating the search result to include indications of the determined objects; and displaying the updated search result.

12. A method in a computer system for correcting a search result obtained by searching a content-index to identify objects that match a search criteria, the objects contained in a collection of objects, the content-index containing, for each of a plurality of terms, a reference to an object in the collection that contains the term, the method comprising the computer-implemented steps of:

updating the collection of objects, after the content-index was last updated causing the search result to be out of date;

removing, from the out of date search result, indications of objects that, as a result of updating of the collection, no longer match the search criteria; and adding, to the out of date search result, indications of objects that, as a result of updating of the collection, now match the search criteria.

13. The method of claim 12 wherein the step of removing indications of objects that, as a result of updating of the collection, no longer match the search criteria removes indications of objects that no longer exist in the collection of objects.

14. The method of claim 12 wherein the step of removing indications of objects that, as a result of updating of the collection, no longer match the search criteria removes indications of objects that have been modified and no longer match the search criteria.

15. The method of claim 12 wherein the step of adding indications of objects that, as a result of updating of the collection, now match the search criteria adds indications of objects that have been added to the collection and match the search criteria.

16. The method of claim 12 wherein the step of adding indications of objects that, as a result of updating of the collection, now match the search criteria adds indications of objects that have been modified and now match the search criteria.

17. The method of claim 12 wherein the objects in the collection are documents.

18. A method in a computer system for correcting a search result that identifies objects that match a search criteria, the objects contained in a collection of objects, the search result generated from a content-index, the content-index containing, for each of a plurality of terms, a reference to an object in the collection that contains the term, wherein the collection is only partially indexed by the content-index, the method comprising the computer-implemented steps of:

updating the collection of objects causing the search result to be out of date;

removing, from the search result, indications of objects that, as a result of updating of the collection, no longer match the search criteria; and adding, to the search result, indications of objects that, as a result of updating of the collection, now match the search criteria, wherein the search result also indicates objects that are in the collection, match the search criteria, but are not indexed by the content-index.

19. The method of claim 18 wherein the collection is indexed by a plurality of content indices and wherein the steps of removing indications of objects that no longer match the search criteria and adding indications of objects that now match the search criteria are determined by examining the plurality of content indices.

20. The method of claim 12 wherein the collection is indexed by a plurality of content indices and wherein the steps of removing indications of objects that no longer match the search criteria and adding indications of objects that now match the search criteria are determined by examining the plurality of content indices.

21. A method in a computer system for correcting a search result obtained by searching a content-index to identify objects that satisfy a search criteria, the objects contained in a collection of objects, the content-index containing, for each of a plurality of terms, a reference to an object in the collection that contains the term, the method comprising the computer-implemented steps of:

updating the collection of objects, after the content-index was last updated, causing the search result to be out of date;

removing, from the out of date search result, indications of objects that, as a result of updating the collection, no longer exist in the collection of objects; and removing, from the out of date search result, indications of objects that, as a result of updating the collection, no longer satisfy the search criteria.

22. The method of claim 21, the content-index having a timestamp for each object referred to by the content-index, each timestamp indicating a time when the corresponding object was last modified, wherein the step of removing, from the out of date search result, indications of objects that no longer satisfy the search criteria comprises the sub-steps of:

examining each object, that is indicated by the search result and has been modified since the time indicated by the timestamp for the object, to determine whether the object still satisfies the search criteria; and when it is determined that an examined object no longer satisfies the search criteria, removing the indication to the object from the search result.

23. The method of claim 21, further comprising the step of adding, to the out of date search result, indications of objects that have been added to the collection as a result of updating the collection and satisfy the search criteria.

24. The method of claim 21, the content-index having a timestamp for each object referred to by the content-index, each timestamp indicating a time when the corresponding object was last modified, further comprising the steps of:

examining each object, that is referred to by the content-index and has been modified since the time indicated by the timestamp for the object, to determine whether the object satisfies the search criteria; and when it is determined that an examined object satisfies the search criteria, adding to the out of date search result an indication of the object.

25. The method of claim 21 wherein the objects in the collection are documents.

26. The method of claim 21, the collection of objects only partially indexed by the content-index, the search result including indications of objects that are in the collection of objects but not indexed by the content-index, and further comprising the steps of:

for each indication of each object in the search result,
first determining whether the object indicated by the indication is not indexed by the content-index; and
when the object is not indexed by the content-index, skipping the indication so that the indication remains in the search result.

27. The method of claim 26 wherein the step of determining whether the object indicated by the indication is not indexed by the content-index is performed by examining a flag stored with the indication in the search result.

28. The method of claim 21 wherein the collection of objects is indexed by a plurality of content indices and wherein the step of removing indications of objects that no longer satisfy the search criteria examines each object that has been modified since the object was indexed by one of the content indices.

29. The method of claim 21 wherein the collection of objects is indexed by a plurality of content indices, the content indices only partially indexing the objects in the collection, the search result including indications of objects that satisfy the search criteria and are in the collection of objects but not indexed by the plurality of content indices, and further comprising the steps of:

for each indication in the search result,
for each content-index, first determining whether the indication indicates an object that is indexed by the content-index; and
when the indication indicates an object not indexed by any of the plurality of content indices, skipping the indication so that the indication remains in the search result.

30. A method in a computer system for correcting a stored search result obtained by searching a content-index to identify objects that satisfy a search criteria, the objects contained in a collection of objects, the content-index containing, for each of a plurality of terms, a reference to an object in the collection that contains the term, the method comprising the computer-implemented steps of:

updating the collection of objects, after the content-index was last updated, causing the search result to be out of date;

adding, to the out of date search result, indications of objects that are new to the collection as a result of updating the collection and satisfy the search criteria; and adding, to the out of date search result, indications of objects that have been modified as a result of updating the collection and now satisfy the search criteria.

31. The method of claim 30 wherein the plurality of objects is a plurality of documents.

32. The method of claim 30, further comprising the step of removing, from the out of date search result, references to objects that no longer exist in the collection of objects.

33. The method of claim 30, further comprising the step of removing, from the out of date search result, references to objects that no longer match the search criteria as a result of updating the collection.

34. The method of claim 30, the collection of objects only partially indexed by the content-index, the collection having an indexing rule to determine whether an object in the collection is indexed by the content-index, the search result including indications of objects that satisfy the search criteria, are in the collection, but not indexed by the content-index, and wherein the step of adding references to objects that are new to the collection of objects and satisfy the search criteria further comprises the steps of:

for each object that is new to the collection as a result of updating,
determining whether the object is referred to by the search result;
when the object is not referred to by the search result, determining whether the indexing rule indicates that the object is to be indexed by the content-index; and
when the indexing rule indicates that the object is to be indexed by the content-index, examining the object to determine whether the object satisfies the search criteria.

35. The method of claim 30 wherein the collection of objects is indexed by a plurality of content indices and wherein the step of adding indications of objects that are new to the collection and indications of objects that have been modified is performed by examining each of the plurality of content indices.

36. The method of claim 30 wherein the collection of objects is indexed by a plurality of content indices, the collection having an indexing rule for each content-index to determine whether an object in the collection is indexed by the content-index, the search result including indications of objects that satisfy the search criteria, are in the collection, but not indexed by the content-index, and wherein the step of adding indications of objects that are new to the collection and satisfy the search criteria further comprises the steps of:

for each object that is new to the collection,
determining whether the object is referred to by the search result;
when the object is not referred to by the search result, determining, for each content-index, whether the indexing rule of the content-index indicates that the object is to be indexed by the content-index; and when the indexing rule for one of the content indices indicates that the object is to be indexed, examining the object to determine whether the object satisfies the search criteria.

37. A method in a computer system for updating a search result that identifies objects that satisfy a search criteria, the objects contained in a collection of objects, the search criteria having a content-index search portion used with a content-index to determine a set of objects of the collection that satisfy the content-index search portion, the search criteria having a direct search portion, the direct search portion further restricting the set of objects that satisfy the content-index search portion in order to satisfy the search criteria, the method comprising the computer-implemented steps of:

generating a proposed list of references to objects that satisfy the content-index portion of the search criteria by searching the content-index;

examining each object in the proposed list of references to determine whether the object also satisfies the direct search portion;

storing in the search result an indication of each examined object that satisfies the direct search portion in the search result;

modifying the collection of objects causing the search result to be out of date; and updating the search result by adding, to the search result, indications of objects that, as a result of modifying the collection, match the search criteria.

38. The method of claim 37 wherein the indications to be added are indications of objects that were added as a result of modifying the collection and match the search criteria and indications of objects that were modified as a result of modifying the collection and now match the search criteria.

39. The method of claim 37 wherein the collection of objects is a plurality of documents.

40. A method in a computer system for correcting a search result, the computer system containing a corpus of documents, the method comprising the computer-implemented steps of:

generating the search result by searching a content-index for a set of documents of the corpus that match a search criteria and by storing in the search result an indication of each document that matches the search criteria, the content-index containing for each of a plurality of terms, a reference to a document associated with the term;

removing, from the generated search result, indications of documents that no longer exist in the corpus;

removing, from the generated search result, indications of documents that no longer match the search criteria;

adding, to the generated search result, indications of documents that are new to the corpus since the content-index was last updated and match the search criteria; and adding, to the search result, indications of each document that has been modified since the document was last indexed by the content-index and now matches the search criteria, wherein the steps of removing from and adding to the generated search result are performed without first updating the content-index.

41. A method in a computer system for correcting a search result, the computer system containing a corpus of documents, the method comprising the computer-implemented steps of:

generating the search result by searching a content-index for a set of documents of the corpus that match a search criteria and by storing in the search result an indication of each document that matches the search criteria, the content-index containing for each of a plurality of terms, a reference to a document associated with the term, wherein the corpus is only partially indexed by the content-index such that the generated search result stores indications to documents that are in the corpus, match the search criteria, but are not indexed by the content-index;

removing, from the search result, indications of documents that no longer exist in the corpus;

removing, from the search result, indications of documents that no longer match the search criteria;

adding, to the search result, indications of documents that are new to the corpus since the content-index was last updated and match the search criteria; and adding, to the search result, indications of each document that has been modified since the document was last indexed by the content-index and now matches the search criteria.

42. The method of claim 41 wherein the corpus is indexed by a plurality of content indices.

43. The method of claim 42 wherein the step of removing indications of documents that no longer match the search criteria uses the plurality of content indices to determine whether a document has been modified.

44. The method of claim 40 wherein the corpus is indexed by a plurality of content indices.

45. A computer system for adding false negative results to a search result store, the search result store having references to objects from a collection of objects that match a search criteria, comprising:

an search result adder that, in response to receiving a additions list of references to objects, adds each reference in the additions list to the result store;

an object direct search engine that, in response to receiving a search list of references to objects to be searched, searches each object referred to by the search list to determine whether the object matches the search criteria and passes a list of references to the searched objects that match the search criteria to the search result adder as the additions list;

an object reference subtractor that, in response to receiving a first list of references to objects and a second list of references to objects, compares each list, generates a revised potential additions list that includes references to objects that are referred to in the first list but not in the second list, and passes the revised potential additions list to the object direct search engine;

an object list comparator that, in response to receiving a third list of references to objects and a fourth list of references to objects, compares the third list with the fourth list and generates a potential additions list that includes references to objects that are referred to in the third list but that are not referred to in the fourth list and that includes references to objects that are referred to in both the third and fourth lists but have been modified since a timestamp associated with the reference to the object in the fourth list, and passes the generated potential additions list to the object reference subtractor as the first list;

a search result list sorter that, in response to receiving a list of references to objects referred to by the search result store, generates a sorted list of references to objects referred to by the search result store, and passes the sorted list of references to objects referred to by the search result store to the object reference subtractor as the second list;

a collection object list sorter that, in response to receiving a list of references to the objects in the collection, generates a sorted list of references to objects in the collection and passes the sorted list of references to objects in the collection to the object list comparator as the third list;

a content-index object list sorter that, in response to receiving a list of references to objects indexed by the content-index, generates a sorted list of references to indexed objects and passes the sorted list of references to indexed objects to the object list comparator as the fourth list; and an invocation mechanism that sends the list of references referred to by the search result store to the search result list sorter, sends the list of references to the objects in the collection to the collection object list sort, and sends the list of references to objects indexed by the content-index to the content-index object list sorter.

46. The computer system of claim 45, each generated list having elements, and wherein the object reference subtractor, the object direct search engine, and the search result adder work together in a pipelined architecture processing an element at a time as each element is received.

47. A computer system for removing false positive results from a search result store, the search result store having references to objects from a collection of objects that match a search criteria, comprising:

an search result subtractor that, in response to receiving a subtractions list of references to objects, removes each reference in the subtractions list from the result store;

an object direct search engine that, in response to receiving a search list of references to objects to be searched, searches each object referred to by the search list to determine whether the object matches the search criteria and passes a list of references to the searched objects that do not match the search criteria to the search result remover as the subtractions list;

an object list comparator that, in response to receiving a first list of references to objects and a second list of references to objects, compares each list, generates a revised potential subtractions list that includes references to objects are referred to by both the first and second lists and have been modified since a timestamp associated with the reference to the object in the second list, and passes the potential subtractions list to the object direct search engine as the search list;

an object list existence determiner that, in response to receiving a third list of references to objects and a fourth list of references to objects, compares the third list and the fourth list, generates an existing objects list that includes references to objects that are referred to in both the third list and in the fourth list, generates a non-existing objects list that includes references to objects that are referred to in the third list but not in the fourth list, passes the generated existing objects list to the object list comparator as the first list, and passes the generated non-existing objects list to the search result remover as the subtractions list;

a search result list sorter that, in response to receiving a list of references to objects referred to by the search result store, generates a sorted list of references to objects referred to by the search result store, and passes the sorted list of references to objects referred to by the search result store to the object list existence determiner as the third list;

a collection object list sorter that, in response to receiving a list of references to the objects in the collection, generates a sorted list of references to objects in the collection and passes the sorted list of references to objects in the collection to the object list existence determiner as the fourth list;

a content-index object list sorter that, in response to receiving a list of references to objects indexed by the content-index, generates a sorted list of references to indexed objects and passes the sorted list of references to indexed objects to the object list comparator as the second list; and an invocation mechanism that sends the list of references referred to by the search result store to the search result list sorter, sends the list of references referred to by the search result store and to the search result remover, sends the list of references to the objects in the collection to the collection object list sorter, and sends the list of references to objects indexed by the content-index to the content-index object list sorter.

48. The computer system of claim 47, each generated list having elements, and wherein the object list comparator, the object direct search engine, and the search result remover work together in a pipelined architecture processing an element at a time as each element is received.

49. A computer system for removing false positive results from a search result store and for adding false negative results to the search result store, the search result store generated by searching a content-index for objects from a collection of objects that match a search criteria, the search result store having references to the matching objects, comprising:

means for removing, from the search result store, references to objects that no longer exist in the collection;

means for removing, from the search result store, references to objects that no longer match the search criteria;

means for adding, to the search result store, references to objects that are new to the collection and match the search criteria; and means for adding, to the search result store, references to each object that has been modified since the object was indexed and that matches the search criteria, the means for removing and the means for adding operating without first updating the content-index.

50. A computer-readable memory medium containing instructions for controlling a computer processor in a computer system to correct a search result obtained by searching a content-index to identify objects that match a search criteria, the objects contained in a collection of objects, the content-index containing, for each of a plurality of terms, a reference to an object in the collection that contains the term, by performing the steps of:

determining a current state of the collection of objects; and when it is determined that the search result obtained by searching the content-index is out of date relative to the current state of the collection of objects, correcting the search result to reflect updates to the collection of objects since the content-index was last updated, without first updating the content-index.

51. The computer-readable memory medium of claim 50 wherein the step of correcting the search result to reflect updates to the collection removes from the search result indications of objects that, as a result of updating of the collection, no longer match the search criteria and adds to the search result indications of objects that, as a result of updating of the collection, now match the search criteria.

52. The computer-readable memory medium of claim 50 wherein the step of correcting the search result to reflect updates to the collection removes indications of objects that no longer exist in the collection and removes indications of objects that have been modified and no longer match the search criteria.

53. The computer-readable memory medium of claim 50 wherein the step of correcting the search result to reflect updates to the collection adds indications to objects that have been added to the collection and match the search criteria and adds indications to objects that have been modified and now match the search criteria.

54. A method in a computer system for correcting a search result that identifies objects that satisfy a search criteria, the objects contained in a collection of objects, the search result generated using a content-index, the content-index containing, for each of a plurality of terms, a reference to an object in the collection that contains the term, the content-index having a timestamp for each object referred to by the content-index, each timestamp indicating a time when the corresponding object was last modified, the method comprising the computer-implemented steps of:

updating the collection of objects causing the search result to be out of date;

removing, from the search result, indications of objects that, as a result of updating the collection, no longer exist in the collection of objects; and removing, from the search result, indications of objects that, as a result of updating the collection, no longer satisfy the search criteria by:

examining each object, that is indicated by the search result and has been modified since the time indicated by the timestamp for the object, to determine whether the object still satisfies the search criteria; and when it is determined that an examined object no longer satisfies the search criteria, removing the indication to the object from the search result.

55. A method in a computer system for correcting a search result that identifies objects that satisfy a search criteria, the objects contained in a collection of objects, the search result generated using a content-index, the content-index containing, for each of a plurality of terms, a reference to an object in the collection that contains the term, the content-index having a timestamp for each object referred to by the content-index, each timestamp indicating a time when the corresponding object was last modified, the method comprising the steps of:

updating the collection of objects causing the search result to be out of date;

removing, from the search result, indications of objects that, as a result of updating the collection, no longer exist in the collection of objects;

removing, from the search result, indications of objects that, as a result of updating the collection, no longer satisfy the search criteria;

examining each object, that is referred to by the content-index and has been modified since the time indicated by the timestamp for the object, to determine whether the object satisfies the search criteria; and when it is determined that an examined object satisfies the search criteria, adding to the search result an indication of the object.

56. A method in a computer system for correcting a search result that identifies objects that satisfy a search criteria, the objects contained in a collection of objects, the search result generated using a content-index, the content-index containing, for each of a plurality of terms, a reference to an object in the collection that contains the term, the collection of objects only partially indexed by the content-index, the search result including indications of objects that are in the collection of objects but not indexed by the content-index, the method comprising the steps of:

updating the collection of objects causing the search result to be out of date;

for each indication of each object in the search result, first determining whether the object indicated by the indication is not indexed by the content-index; and when the object is not indexed by the content-index, skipping the indication so that the indication remains in the search result;

removing, from the search result, indications of objects that, as a result of updating the collection, no longer exist in the collection of objects; and removing, from the search result, indications of objects that, as a result of updating the collection, no longer satisfy the search criteria.

57. The method of claim 56 wherein the step of determining whether the object indicated by the indication is not indexed by the content-index is performed by examining a flag stored with indication in the search result.

58. A method in a computer system for correcting a search result that identifies objects that satisfy a search criteria, the objects contained in a collection of objects that is indexed by a plurality of content indices, the content indices only partially indexing the objects in the collection, each contents-index containing, for each of a plurality of terms, a reference to an object in the collection that contains the term, the search result generated using a content-index and including indications of objects that satisfy the search criteria and are in the collection of objects but not indexed by the plurality of content indices, the method comprising the steps of:

updating the collection of objects causing the search result to be out of date;

for each indication in the search result, for each content-index, first determining whether the indication indicates an object that is indexed by the content-index; and when the indication indicates an object not indexed by any of the plurality of content indices, skipping the indication so that the indication remains in the search result;

removing, from the search result, indications of objects that, as a result of updating the collection, no longer exist in the collection of objects; and removing, from the search result, indications of objects that, as a result of updating the collection, no longer satisfy the search criteria.

59. A method in a computer system for correcting a stored search result that identifies objects that satisfy a search criteria, the search result generated using a content-index, the objects contained in a collection of objects that are only partially indexed by the content-index, the collection having an indexing rule to determine whether an object in the collection is indexed by the content-index, the content-index containing, for each of a plurality of terms, a reference to an object in the collection that contains the term, the search result including indications of objects that satisfy the search criteria, are in the collection, but not indexed by the content-index, the method comprising the computer-implemented steps of:

updating the collection of objects causing the search result to be out of date;

adding, to the search result, indications of objects that are new to the collection as a result of updating the collection and satisfy the search criteria by:

for each object that is new to the collection as a result of updating, determining whether the object is referred to by the search result;

when the object is not referred to by the search result, determining whether the indexing rule indicates that the object is to be indexed by the content-index; and when the indexing rule indicates that the object is to be indexed by the content-index, examining the object to determine whether the object satisfies the search criteria; and adding, to the search result, indications of objects that have been modified as a result of updating the collection and now satisfy the search criteria.

60. A method in a computer system for correcting a stored search result that identifies objects that satisfy a search criteria, the search result generated using a content-index, the objects contained in a collection of objects that is indexed by a plurality of content indices, the collection having an indexing rule for each content-index to determine whether an object in the collection is indexed by the content-index, each content-index containing, for each of a plurality of terms, a reference to an object in the collection that contains the term, the search result including indications of objects that satisfy the search criteria, are in the collection, but not indexed by the content-indices, the method comprising the computer-implemented steps of:

updating the collection of objects causing the search result to be out of date;

adding, to the search result, indications of objects that are new to the collection as a result of updating the collection and satisfy the search criteria by:

for each object that is new to the collection, determining whether the object is referred to by the search result;

when the object is not referred to by the search result, determining, for each content-index, whether the indexing rule of the content-index indicates that the object is to be indexed by the content-index; and when the indexing rule for one of the content indices indicates that the object is to be indexed, examining the object to determine whether the object satisfies the search criteria; and adding, to the search result, indications of objects that have been modified as a result of updating the collection and now satisfy the search criteria.

\* \* \* \* \*